United States Patent
Van Osten et al.

(10) Patent No.: US 10,585,906 B2
(45) Date of Patent: Mar. 10, 2020

(54) QUERYING RELATIONSHIPS IN A COMMUNICATION TIME SERIES

(71) Applicant: salesforce.com, inc., San Francisco, CA (US)

(72) Inventors: Robert Michael Van Osten, San Jose, CA (US); Sean Lynch, Redwood City, CA (US); Matthew Burghoffer, Menlo Park, CA (US); Adam Evans, Redwood City, CA (US); Joseph Michael Chrzanowski, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 342 days.

(21) Appl. No.: 15/582,256

(22) Filed: Apr. 28, 2017

(65) Prior Publication Data

US 2018/0314740 A1   Nov. 1, 2018

(51) Int. Cl.
```
G06F 17/30      (2006.01)
G06F 16/2458    (2019.01)
H04L 29/08      (2006.01)
G06F 16/9537    (2019.01)
G06F 16/2457    (2019.01)
G06F 17/27      (2006.01)
G06Q 10/10      (2012.01)
```

(52) U.S. Cl.
CPC .... *G06F 16/2477* (2019.01); *G06F 16/24578* (2019.01); *G06F 16/9537* (2019.01); *G06F 17/279* (2013.01); *G06F 17/2765* (2013.01); *G06Q 10/103* (2013.01); *G06Q 10/107* (2013.01); *H04L 67/10* (2013.01); *H04L 67/22* (2013.01); *H04L 67/306* (2013.01)

(58) Field of Classification Search
CPC ............. G06F 16/2477; G06F 16/9537; G06F 16/24578
See application file for complete search history.

(56) References Cited

U.S. PATENT DOCUMENTS 6,633,867 B1 * 10/2003 Kraft .................. G06Q 30/0601
                                                          705/26.1
2006/0031263 A1 * 2/2006 Arrouye ............ G06F 16/90335

* cited by examiner

*Primary Examiner* — Syed H Hasan
(74) *Attorney, Agent, or Firm* — Holland & Hart LLP

(57) ABSTRACT

A database system may implement communications language queries to query data based on relationships between communications. A user may input a communications language query, and may process the query at a user device or at a database server. In some cases, the database server may process the query based on a periodic or event-based trigger. Processing the query may involve identifying one or more sets of communication events based on the type of communication event or a property of the communication event (e.g., referred to as a moment or score), as well as a temporal, user, or geographic relationship between the sets of communication events. The user device or database server may return a timestamp of a communication event, moment, or score, a number of occurrences of communication events, moments, or scores, or a Boolean value indicating whether a particular communication event, moment, or score exists to the user.

20 Claims, 14 Drawing Sheets

QUERYING RELATIONSHIPS IN A COMMUNICATION TIME SERIES

FIELD OF TECHNOLOGY

The present disclosure relates generally to database systems and data processing, and more specifically to querying relationships in a communication time series.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may process and store communications associated with various CRM interactions in a database. Due to the volume and variety of communications associated with one or more interactions, sorting or filtering through the communications may be complex and difficult to perform. Moreover, a coding language used to query data may not be configured to query communications data, which may add complexity to the querying process.

DETAILED DESCRIPTION

Figure 1:
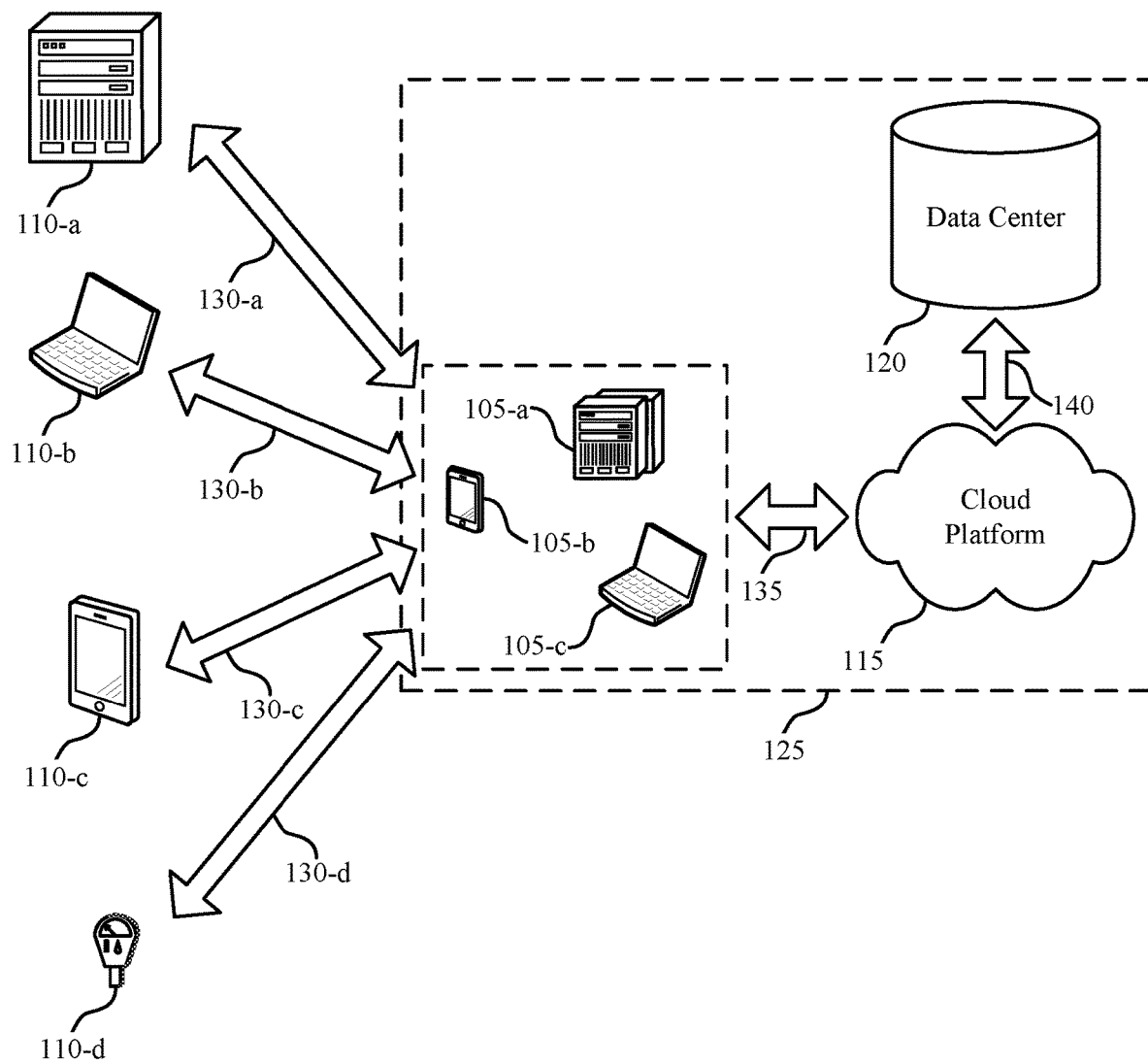
FIGS. 1 and 2 illustrate examples of systems for communication data processing that support querying relationships in a communication time series in accordance with aspects of the present disclosure.

A typical interaction between a customer and a business may involve dozens or even thousands of communications of various types (e.g., emails, phone calls, text messages, social media messages). Because of the volume and variety of communications, it may be difficult for a user to retrieve or sort through the communication data. For example, performing a query on the communication data may require expertise in computer coding. Moreover, a typical coding language used for querying data may not be configured for querying communication data in a way that facilitates determining useful relationships and patterns from the communication data.

In accordance with aspects of the present disclosure, a computing system (e.g., a cloud platform) supporting customer relationship management (CRM) may process and store communications associated with an interaction between a customer and a business, for example. The system may be configured to analyze the content of a communication (e.g., using natural language processing) to identify certain events or characteristics associated with the communication. The computing system may store the identified events and characteristics along with the communications in a database. A user with access to the database may query the communications using a language syntax configured for querying communication data. The communications language query may implement a set number of methods, objects, and/or time periods, which may simplify the process of formulating and running the query. Either a user device or a server associated with the database may process the communications language query, which in some cases may be an example of a signals language query, to retrieve communications data for various types of communications.

Processing the communications language query may involve searching stored communication data for particular types of communications, events, or characteristics of communications. In some cases, the user device or server processing the communications language query may identify one or more communications, and may identify further communications based on their temporal, user, or geographic relationships with the previously identified communications. For example, the user device or server may identify a communication event with a particular characteristic, and may determine whether a communication event received within a specified time period after the identified communication event includes some other particular characteristic. Additionally, the user device or server may process the communications language query to identify specific combinations or sequences of communication characteristics. The communications language query may return information about the identified communications, including timestamps, numbers of occurrences, whether certain communications or communication characteristics exist in the stored communications, or some combination of the above.

Aspects of the disclosure are initially described in the context of systems that support communication data processing. Querying processes are then described, along with several possible communication relationships that a user may include in a communications language query. Aspects of the disclosure are further illustrated by and described with reference to apparatus diagrams, system diagrams, and flowcharts that relate to querying relationships in a communication time series.

FIG. 1 illustrates an example of a system 100 for cloud computing that supports querying relationships in a communication time series in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type. The system 100 may support a user (e.g., a user associated with a cloud client 105) querying communication data based on relationships within a communication time series.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A cloud client 105 or a database server, which may be a component of data center 120, may process a communications language query to retrieve communication information. A user may input the query using a language configured for querying communications data, which may utilize a user-friendly syntax to reduce coding complexity.

Data center 120 may store data associated with communication events. The communication events may be examples of communications (e.g., emails, voicemails, calendar events, etc.) received at various times, and sent from various users and locations. The communications language query may specify data to retrieve based on relationships between the times, users, or locations associated with the communication events. In some cases, the cloud client 105 or database server may process the communications language query based on a query call from a user, a periodic trigger, or an event-based trigger. Based on the communications language query, the cloud client 105 may display an indication of the retrieved data to the user.

Figure 2:
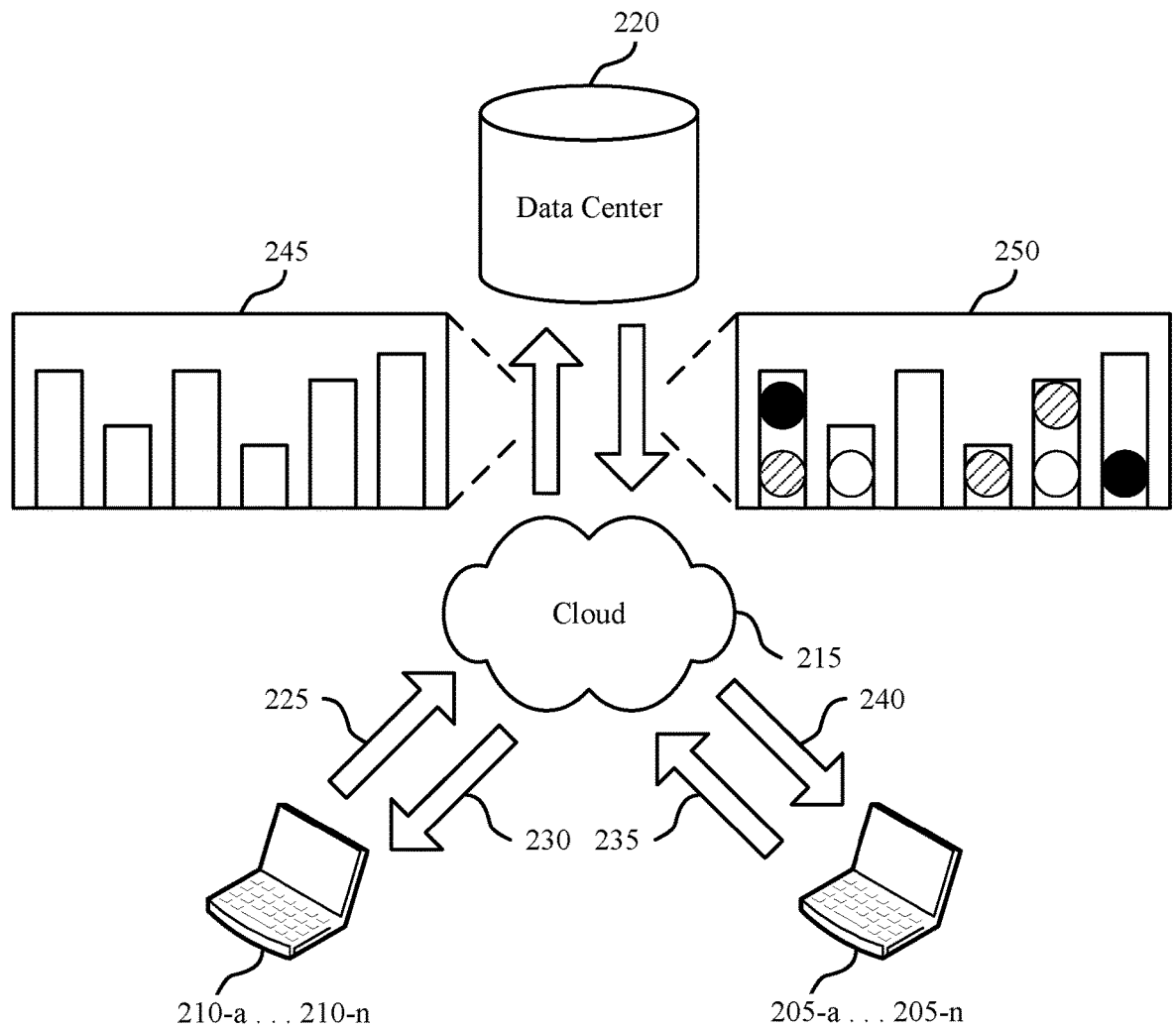

FIG. 2 illustrates an example of a system 200 for communication data processing that supports querying relationships in a communication time series in accordance with various aspects of the present disclosure. The system 200 includes cloud clients 205, contacts 210, cloud platform 215, and data center 220, which may be examples of the corresponding systems or devices described with reference to FIG. 1. System 200 may include any number of cloud clients 205 and contacts 210 (e.g., cloud client 205-a to cloud client 205-n, and contact 210-a to contact 210-n). The cloud clients 205 or contacts 210 may be laptops, servers, smartphones, desktop computers, tablets, sensors, or other computing devices or systems capable of generating, analyzing, transmitting, or receiving communications.

Cloud client 205-a and contact 210-a may communicate over communication links 225, 230, 235, and 240, which may be examples of any wireless or wired data communication links. A communication may be an email, a calendar event, a service ticket, a short message service (SMS) text message, a voice call, a transcription of a voice call, a social media message, or any other form of electronic communication. Contact 210-a may transmit a first communication on communication link 225 to the cloud platform 215, and cloud client 205-a may receive the first communication on communication link 240. Additionally, cloud client 205-a may transmit a second communication on communication link 235, and contact 210-*a* may receive the second communication on communication link 230. In some examples, communications may be sent directly between contact 210-*a* and cloud client 205-*a* and then forwarded or otherwise shared with the cloud platform 215.

Cloud platform 215 may transmit communications to data center 220. The communications may be examples of communications transmitted or received by cloud client 205-*a*. As shown in graphical display 245, the communications may be represented as a bar graph, where the height of each bar indicates the number of communications over a given time period (e.g., hours, days, or weeks). Communications over a given period of time may be referred to as a time series of communications.

Data center 220 may perform analysis on a time series of communications (e.g., using natural language processing, or another machine learned model or technique) to identify certain properties of a communication. For example, the natural language processing may include a server that implements natural language modeling, parsing, word segmentation, tagging, or any combination thereof to determine properties of the communication. In some cases, the natural language processor may include a simple recognition function to identify a name, a question, a price, a specific word or phrase (e.g., "schedule", "When can we meet?", etc.), or any other relevant parameter. In other cases, the natural language processor may implement a complex algorithm to determine a level of agreeability, a tone, or any other information associated with the communication.

Using the natural language processor, data center 220 may analyze the communication to determine whether a specific event occurred during the communication or was otherwise associated with the communication. The communication may also be analyzed to determine a numerical assessment associated with a characteristic of the communication. These properties or a combination of these properties may be generally referred to as communication moments associated with a communication. In some examples, whether a particular event occurred may be referred to as a moment, whereas a numerical assessment of a communication may be referred to as a score. As shown in graphical display 250, the moments 255 may be illustrated as circles superimposed over the bar representing the communications that the moments 255 are associated with.

Moments may be designated by different types, as illustrated by the different fill patterns of the moments 255 in the graphical display 250. The different types of moments may include a competitor mention, a product mention, pricing mention, timing mention, specific member involvement, a specific attachment to the communication, scheduling of a meeting, rescheduling of a meeting, or any other occurrence associated with a communication. In some cases, a moment may be represented as a Boolean value. For example, data center 220 may set a moment to one value if it identifies that the specific event occurs, and may set the moment to a different value if it does not identify that the specific event occurs. Alternatively, data center 220 may not create a moment if it does not identify that the specific event occurred during a communication.

In some cases, data center 220 may perform analysis on the time series of communications (e.g., using natural language processing) to identify a numerical characterization of a communication. These numerical characterizations of communications may be referred to as scores associated with a communication. The score may also be referred to as a parametric score. In some examples, the score may be a value between 0 and 1. A communication may be analyzed and numerically assessed based on agreeability, tone, responsiveness, or any other measureable characterization of a communication. The information gleaned from the combination of moments and scores over the course of a time series of communications may be referred to as an insight.

In some examples, data center 220 may identify moments, scores, and insights dynamically (e.g., in real time) as communications are transmitted or received. In other examples, data center 220 may identify moments, scores, and insights from batches of data, which may be stored in a database at data center 220. In some examples, cloud client 205 or a server associated with cloud platform 215 may identify the moments, scores, and insights from a time series of communications based on communications transmitted and received by cloud client 205-*a*. In these examples, data center 220 may or may not receive or process the communications.

A cloud client 205 may query time-based information from data center 220. A user may input a communications language query into cloud client 205 using a syntax configured for querying communications data. In some cases, data center 220 may transmit the identified moments, scores, and insights to the cloud client 205, and the cloud client 205 may process the query. In other cases, the cloud client 205 may transmit the query to data center 220, and a server at data center 220 may process the query. In some cases, the user may create a trigger rule based on the syntax of the query language. For example, the trigger rule may specify a query to process when specific time-based information is sent to the cloud client 205 or the data center 220.

The cloud client 205 may implement a communications language query to retrieve communication specific information. In some cases, the communications language query may be an example of a signals language query. The cloud client 205 may use the communications language query to retrieve moments 255 (e.g., a contact was sent, a specific competitive product was mentioned, etc.), scores (e.g., how punctual was a response of the customer relative to other responses of the customer, how formal is a communication event, etc.), events (e.g., an email, a calendar event, etc.), or a combination thereof. In other cases, the cloud client 205 may retrieve relevant information about the moments 255, scores, or events based on the communications language query. For example, the cloud client 205 may retrieve a time or timestamp corresponding to an occurrence of a moment 255, score, or event. In another example, the query may specify a relative time range, and the cloud client 205 may identify a moment 255, score, or event of a specific type. The cloud client 205 may apply the time range relative to the identified moment 255, score, or event, and may retrieve a count of moments 255, scores, or events that occur within the time range. In yet another example, the cloud client 205 may return a Boolean value (e.g., representing a 'yes' or 'no') based on whether a specific moment 255, score, or event exists with specified parameters and within a specified window of the stored time-based information. In some cases, the cloud client 205 may identify a first moment 255, score, or event, and may retrieve information associated with a subsequent or previous moment 255, score, or event based on the communications language query.

Either the cloud client 205 or a database server at the data center 220 may process the query. In some cases, the communications language code may be implemented on top of JavaScript. A user may input the query (e.g., using JavaScript code) to the cloud client 205. If the cloud client 205 stores the moments 255, scores, and events information, the cloud client 205 may process the query (e.g., in a web browser) without a call to a server. The cloud client 205 may process the query and retrieve information from its stored data (e.g., data previously received from data center 220). In this way, the system 200 may save processing time (e.g., the time a processing request may spend in a backlog or queue on the server side) and resources at the server. In other cases, the cloud client 205 may send the query to a database server (e.g., at data center 220), and the database server may process the query and retrieve information from the data stored at data center 220. In some cases, the database server may process the query periodically or may process the query based on a trigger rule.

In some cases, the cloud client 205 or database server may process the query using a language parser. For example, the cloud client 205 or database server may process the query by generating language parsers, with may in turn generate and process abstract syntax trees. A language parser may identify errors or inefficient code, and may notify a user based on the identification. In some cases, the user may add extensions to the code based on the language parser. For example, an extension may implement constants or security protocol within the query. A security protocol may not allow the cloud client 205 or database server to perform certain processes (e.g., perform eval or http requests) based on a security level associated with the user or the data.

The cloud client 205 or database server may process the query based on web workers, JavaScript engines, or trigger rules. For example, the cloud client 205 may use web workers in a web browser to parallelize work and provide a secure sandbox. The cloud client 205 may run many requests (e.g., thousands or millions) by using the web workers. The cloud client 205 may process the query without waiting for the database server to become available for data processing. In some cases, the database server may process the query at a node. The database server may use a JavaScript engine (e.g., Nashorn) to process the query. The processing may be queued in the database server. In some cases, the query may specify a trigger rule. For example, the database server may process the code when a certain type of event or moment 255 is received and stored at the database server (i.e., the certain type of event or type of moment 255 triggers the query processing).

Figure 3:
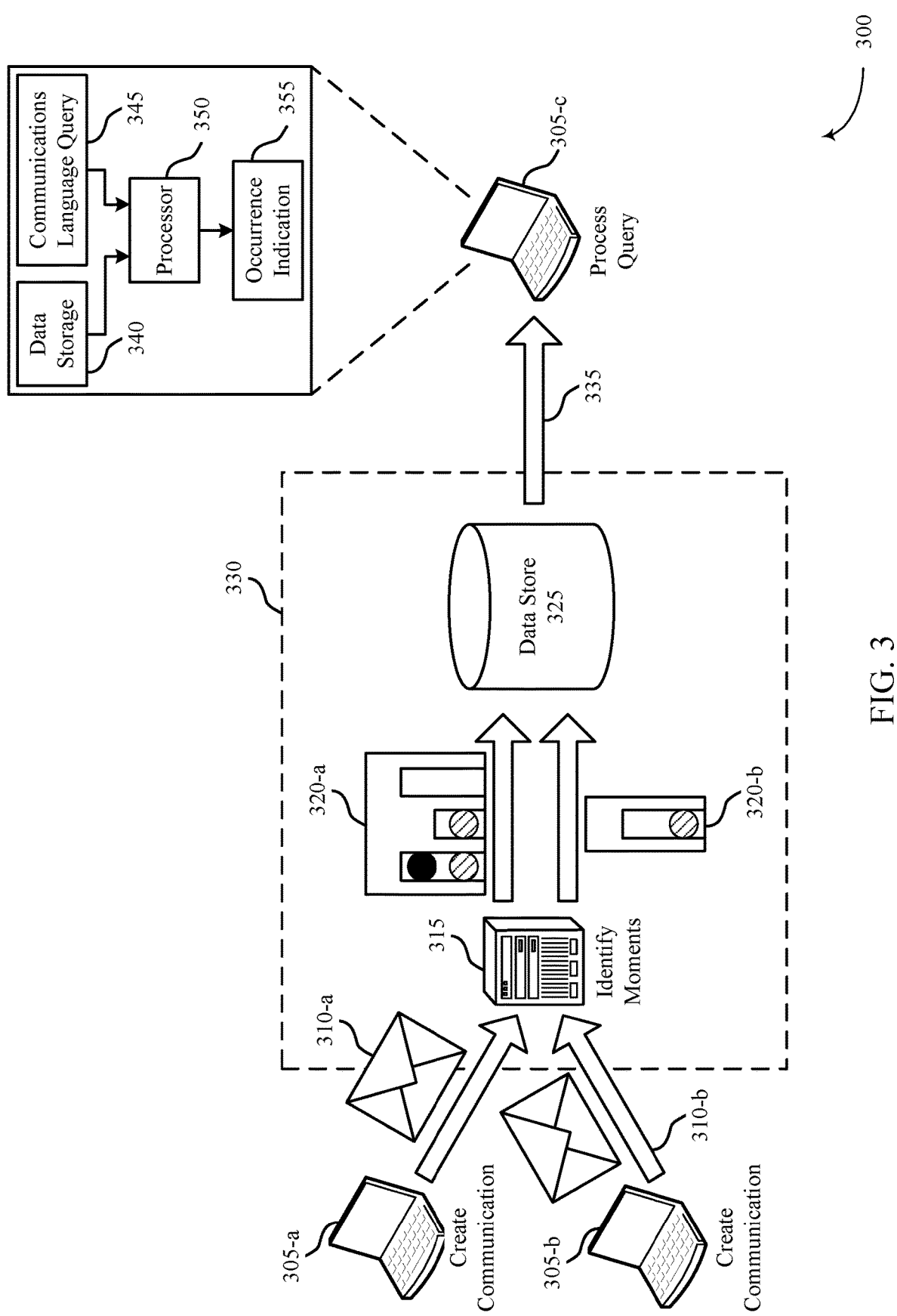
FIGS. 3 and 4 illustrate examples of querying processes that support querying relationships in a communication time series in accordance with aspects of the present disclosure.

FIG. 3 illustrates an example of a querying process 300 that supports querying relationships in a communication time series in accordance with various aspects of the present disclosure. The querying process 300 may include multiple user devices 305, which may be examples of cloud clients or contacts as described with reference to FIGS. 1 and 2. The querying process 300 may also include system 330, which may include servers 315 and data stores 335. In some cases, system 330 may be an example of a component of subsystem 125 (e.g., data center 120) as described with reference to FIG. 1. In the querying process 300, a user device 305 (e.g., user device 305-*c*) may perform client-side processing of a communications language query.

One or more user devices 305 (e.g., user devices 305-*a* and 305-*b*) may create communications 310 (e.g., emails). The user devices 305 may send the communications 310 to system 330. Server 315 may receive and process the communications 310 (e.g., communications 310-*a* and 310-*b*). Communication 310-*a* may be a first communication event within a time series of communications, and communication 310-*b* may be a second communication event within the time series. Server 315 may analyze the communications 310 or the time series of communications to identify communication moments, which may be examples of moments or scores as described with reference to FIG. 2. For example, server 315 may perform natural language processing on the communications 310 to identify the moments or scores within the communications 310.

Server 315 may send the time series of communications, including the identified moments and scores, to data store 325. The time series of communications, including the identified moments and scores, may be represented by graphical representations 320. In some cases, graphical representation 320-*a* may represent multiple communication events, while graphical representation 320-*b* may represent a single communication event. In some cases, system 330 may perform further processing on the communications 310, moments, or scores. Data store 325 may store the communications, including the identified moments and scores. In some cases, data store 325 may send the stored communications, along with the identified moments and scores, to a user device 305 (e.g., user device 305-*c*) in transmission 335. For example, if user device 305-*c* may handle and store the data size associated with the stored communications, moments, and scores, data store 325 may transmit the communication data to user device 305-*c*. User device 305-*c* may store the communication data in data storage 340.

A user may input a query to user device 305-*c*. The query may be an example of a query 345 or a batch of queries, which may include one or more methods from a set of methods. Each method may relate to a data type from a set of data types, including moments, scores, and communication events. A method may take a type of moment, score, or communication event as an input, as well as a time range or a timestamp. Based on the inputs, a method may identify all moments, scores, or communication events of the specified type within the specified time range. In other cases, the method may identify a next or previous moment, score, or communication event with respect to a timestamp, a first or last moment, score, or communication event in a time range, a number of occurrences of a moment, score, or communication event type in a time range, or whether a moment, score, or communication event type exists within a time range. In yet other cases, the method may identify particular combinations or sequences of moments, scores, or communication events. Depending on the method, a query 345 may return one or more Booleans, integer values, timestamps, or instances of moments, scores, communication events, or combinations of these.

The communications language query 345 may support a set of period types for time ranges or timestamps. For example, the time range or timestamp may be defined in seconds, minutes, hours, days, months, quarters, years, or any other segment of time. In some cases, the time range may be segmented. For example, the time range may be defined as a specific weekday, where the communications language query 345 may identify moments, scores, or communication events associated with that weekday across multiple weeks.

User device 305-*c* may process the communications language query 345 or batch of communications language queries using processor 350. For example, a user may select to run one or more communications language queries 345 on user device 305-*c* to retrieve communication information stored in data storage 340. In some cases, the user device 305-*c* may process a communications language query 345 as JavaScript in a background task in its web browser. In this way, system 330 may pass multiple processes onto the user device 330-*c*, rather than processing the communications language query 345 or batch of communications language queries on a server 315 and inducing overhead in system 330.

The processor 350 may process the communications language query 345, and may retrieve communication information from data storage 340 based on the methods of the communications language query 345. The processor 350 may output an occurrence indication 355. For example, the occurrence indication 355 may be an example of timestamps when an identified moment, score, or communication event occurred, counts of how many moments, scores, or communication events occurred in a time range, Booleans indicating whether a certain moment, score, or communication event type occurred in a time range, or a combination thereof. User device 305-c may display the occurrence indication 355 to the user.

Figure 4:
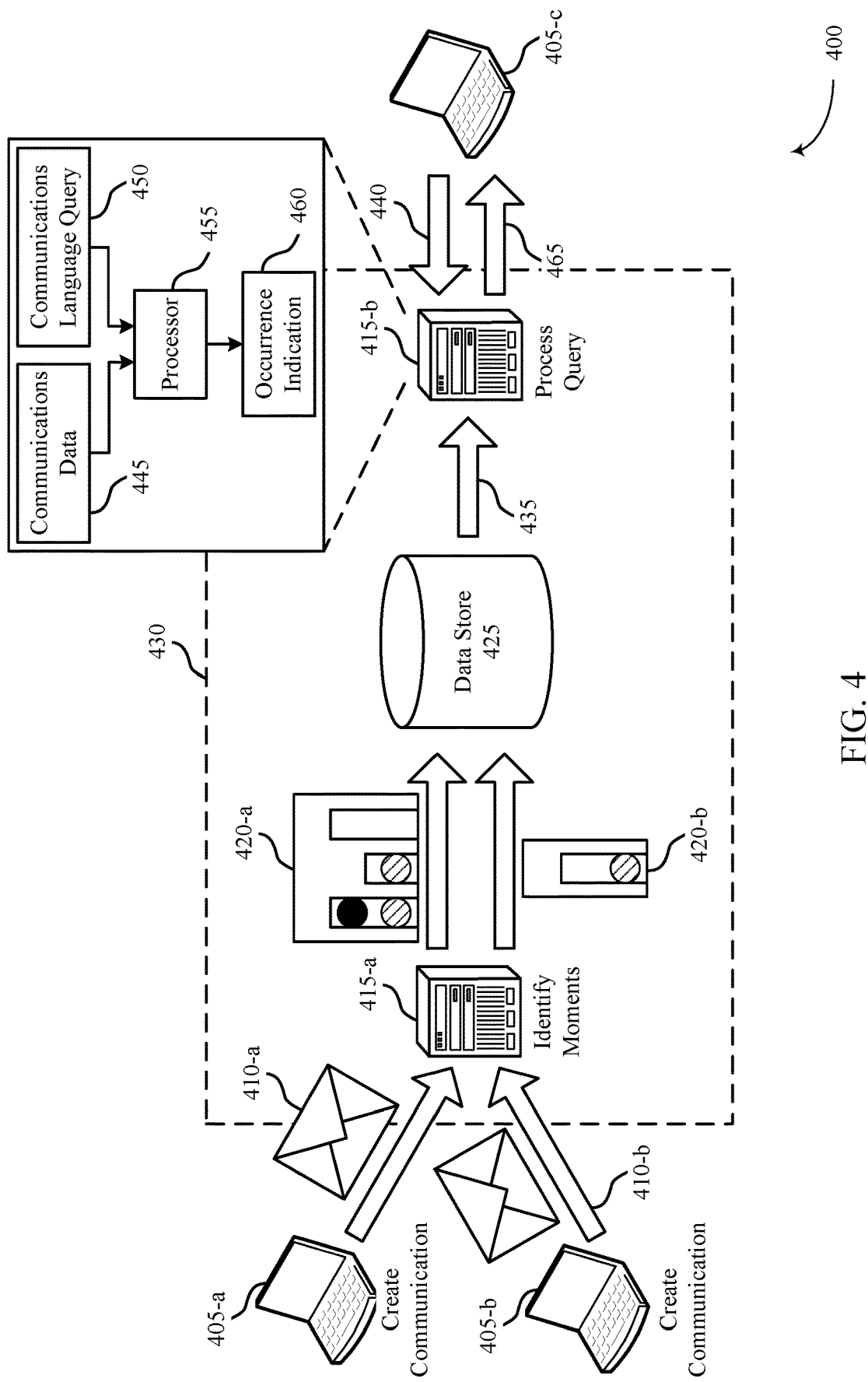

FIG. 4 illustrates an example of a querying process 400 that supports querying relationships in a communication time series in accordance with various aspects of the present disclosure. The querying process 400 may include multiple user devices 405, which may be examples of cloud clients or contacts as described with reference to FIGS. 1 and 2. The querying process 400 may also include system 430, which may include servers 415 and data stores 435. In some cases, system 430 may be an example of a component of subsystem 125 (e.g., data center 120) as described with reference to FIG. 1. In the querying process 400, a server 415 (e.g., server 415-b) may receive a communications language query 450 from a user (e.g., the user operating user device 405-c). Server 415-b may perform server-side processing of the communications language query, and may return the output to user device 405-c.

One or more user devices 405 (e.g., user devices 405-a and 405-b) may create communications 410. The user devices 405 may send the communications 410 to system 430. A database server, such as server 415-a, may receive and process the communications 410 (e.g., communications 410-a and 410-b). Communication 410-a may be a first communication event within a time series of communications, and communication 410-b may be a second communication event within the time series. Server 415-a may analyze the communications 410 or the time series of communications to identify communication moments, which may be examples of moments or scores. For example, server 415-a may perform natural language processing on the communications 410 to identify the moments or scores within the communications 410.

Server 415-a may send the time series of communications, including the identified moments and scores, to data store 425. The time series of communications, including the identified moments and scores, may be represented by graphical representations 420. In some cases, graphical representation 420-a may represent multiple communication events, while graphical representation 420-b may represent a single communication event. In some cases, system 430 may perform further processing on the communications 410, moments, or scores. Data store 425 may store the communications, including the identified moments and scores.

A user may input a communications language query 450 into a user device 405 (e.g., user device 405-c) that has access to system 430. User device 405-c may send the communications language query 450 to system 430 in transmission 440 for processing. For example, user device 405-c may determine that it is not storing the communications, moments, and scores. In some cases, user device 405-c may identify a periodic or event-based trigger specified in the communications language query 450. User device 405-c may send the communications language query 450 to system 430 based on the identified trigger. In system 430, a database server, such as server 415-b, may receive the communications language query 450 for processing.

Server 415-b may process the communications language query 450 using processor 455. For example, the user may select to run a batch of communications language queries, where the batch of communications language queries may include one or more communications language queries 450. In some cases, the batch of communications language queries may include multiple iterations of a similar query. For example, each iteration may change one query parameter from a previous iteration (e.g., the multiple iterations may query for the same communication information from slightly different time periods).

In some cases, server 415-b may process the communications language query 450 based on a trigger. In one example, the trigger may specify a periodicity. The periodicity may be a length of time set by the user in the communications language query 450, or may be a predetermined length of time. Server 415-b may identify a timestamp corresponding to the most recent time the communications language query 450 or batch of communications language queries was processed, and may determine when the length of time associated with the periodicity has passed since the identified timestamp. Server 415-b may process the communications language query 450 or batch of communications language queries again based on the length of time passing. In this way, server 415-b may periodically process the communications language query 450 or batch of communications language queries at set time intervals, so that new communications 410 received during the time interval may be queried.

In another example, the trigger may specify an event. In some cases, the specified event may be receiving a specific type of communication event, moment, or score at system 430. For example, the event-based trigger may specify receiving a communication 410 with a poor tone (e.g., a tone score below a certain threshold, such as a 4 out of 10). When the specified event occurs, server 415-b may process the communications language query 450 or batch of communications language queries based on the event.

In order to process a communications language query 450, server 415-b may receive communications data 445 from data store 425 (e.g., over data link 435). In some cases, server 415-b may receive communications data 445 from a variety of data sources. For example, user device 405-c may also send communications data 445 to server 415-b based on data stored in user device 405-c. Server 415-b may process the communications language query 450 using a processor 455 (e.g., either based on a user selection or a trigger rule). The processor 455 may retrieve communication information from communications data 445 based on the methods of the communications language query 450. The processor 455 may output an occurrence indication 460, which server 415-b may send to user device 405-c in transmission 465. User device 405-c may display the occurrence indication 460 to the user.

Figure 5:
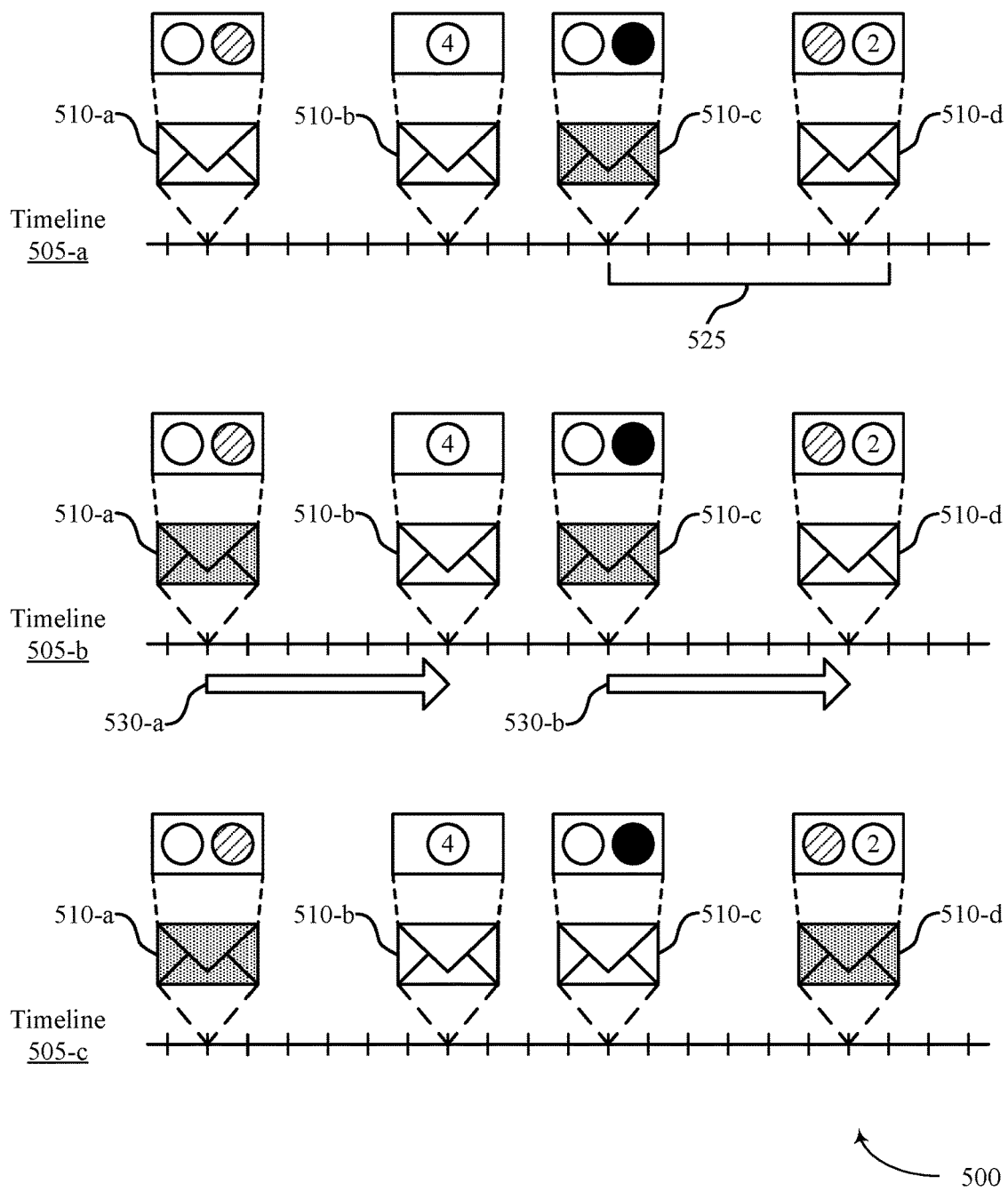
FIG. 5 illustrates an example of a communication time series that supports querying relationships in the communication time series in accordance with aspects of the present disclosure.

FIG. 5 illustrates an example of a communication time series 500 that supports querying relationships in the communication time series 500 in accordance with various aspects of the present disclosure. The timelines 505 may represent a same time series of communication events with communication events 510-a, 510-b, 510-c, and 510-d, which may be examples of emails, calendar events, service tickets, SMS text messages, voice call transcriptions, social media messages, or any combination thereof. Each communication event 510 may include one or more identified moments 515 (e.g., first moment 515-a, second moment 515-*b*, and third moment 515-*c*), scores 520, neither, or both. Each timeline 505 may represent a different query process for querying relationships in the communication time series 500.

Timeline 505-*a* may represent a communications language query process based on a time range 525. In some cases, the time range 525 may include a constant starting and ending time that a user may specify in the communications language query. In other cases, the time range 525 may include a length of time spanned by the time range 525, and the starting or ending time may be determined relative to a communication event 510, moment 515, or score 520. A user device or server processing the communications language query may determine whether a type of communication event 510, moment 515, or score 520 does or does not occur within the time range 525. Alternatively, the user device or server may determine a first or last communication event 510, moment 515, or score 520 of a specified type within the time range 525.

In a first example, the communications language query may query for any communication events 510 that include an instance of third moment 515-*c* within a constant time range 525. For example, the query may search for whether a deal was created (e.g., indicated by third moment 515-*c*) between March 8 and March 15 (e.g., the period of time represented by the time range 525). In the language syntax of the communications language query, the query may be represented as "MomentExists(DealCreated, range (1488931200, 1489536000))." A user device or server processing the query may identify communication event 510-*c* with third moment 515-*c*, which may occur within the time range 525. In this case, the user device or server may return a Boolean indicating that third moment 515-*c* occurs within the time range 525. For example, the user device or server may set the Boolean to a '1' to indicate that third moment 515-*c* exists in the time range 525. If no such third moment 515-*c* occurs in the specified time range 525, the user device or server may set the Boolean to a '0' in response to the query.

In a second example, the communications language query may query for any communication events 510 that do not include an instance of second moment 515-*b* within a time range 525 following an occurrence of third moment 515-*c*. For example, the query may search for any time ranges 525 when a deal was created (e.g., indicated by third moment 515-*c*) and an executive was not involved (e.g., second moment 515-*b* may indicate executive involvement) within 7 days (e.g., the period of time represented by the time range 525). In the syntax of the communications language query, the query may be represented as "FilterRanges(TimePeriod (Moments(DealCreated), DAY, 7), range=> !MomentExists (ExecInvolvement, range))." A user device or server processing the query may identify communication event 510-*c* with third moment 510-*c*. Based on this identified communication event 510-*c*, the time range 525 may be set to start at the timestamp for receiving communication event 510-*c* (i.e., the time range 525 is set relative to a communication event 510, moment 515, or score 520). The user device or server may identify communication event 510-*d* within the time range 525, and may determine that communication event 510-*d* includes second moment 515-*b*. Therefore, the user device or server may not return the time range 525 in response to the query. If no communication event 510 in time range 525 includes second moment 515-*b*, the user device or server may return the time range 525 in response to the query.

Timeline 505-*b* may represent a communications language query process based on identifying a communication event 510, moment 515, or score 520 relative to another communication event 510, moment 515, or score 520. For example, a user device or server processing the query may identify one or more first communication events 510, moments 515, scores 520, or timestamps associated with one or more of the above. Based on this identification, the user device or server may search for second communication events 510, moments 515, scores 520, or timestamps based on their temporal relation to the identified one or more first communication events 510, moments 515, scores 520, or timestamps. Depending on the method of the communications language query, the user device or server may search for a subsequent or previous communication event 510, moment 515, or score 520.

In an example, the communications language query may query for any communication events 510 that include a score 520 below a certain threshold after an instance of first moment 515-*a*. For example, the query may search for low responsiveness (e.g., indicated by a score 520 below 5) after a pricing mention (e.g., indicated by first moment 515-*a*). In the syntax of the communications language query, the query may be represented as "Ranges(Moments (Pricing), time=> NextScore(Responsiveness, time, score=> score<0.5))." A user device or server processing the query may identify communication events 510-*a* and 510-*c* with first moments 515-*a*, and may determine the timestamps for each of these identified communication events 510. Based on this identification, the user device or server may search for the next score 520 after each determined timestamp with a score value below the specified threshold of 5. For example, from the timestamp for communication event 510-*a*, the user device or server may perform search 530-*a* until identifying communication event 510-*b* with score 520 below the threshold. Additionally, the user device or server may perform search 530-*b* from communication event 510-*c* until identifying communication event 510-*d* with score 520 below the threshold. The user device or server may return the ranges represented by searches 530-*a* and 530-*b* in response to the query.

Timeline 505-*c* may represent a communications language query process based on identifying any communication events 510, moments 515, or scores 520 in the communication time series 500 that match a certain criteria. In some cases, the user may specify in the query a time range that spans the entire communication time series 500. In other cases, the user may not specify a time range in the query. A user device or server processing the query may search the entire communications time series 500 when retrieving communications data based on the query.

In an example, the communications language query may query for a count of communication events 510 that include an instance of second moment 515-*b*. For example, the query may search for the number of occurrences of executive involvement (e.g., indicated by second moment 515-*b*) within the communication time series 500. In the syntax of the communications language query, the query may be represented as "MomentCount (ExecInvolvement)." A user device or server processing the query may identify communication events 510-*a* and 510-*d* with second moments 515-*b*, and may return an integer (e.g., 2) indicating the number of occurrences of second moments 515-*b* within communications time series 500.

Figure 6:
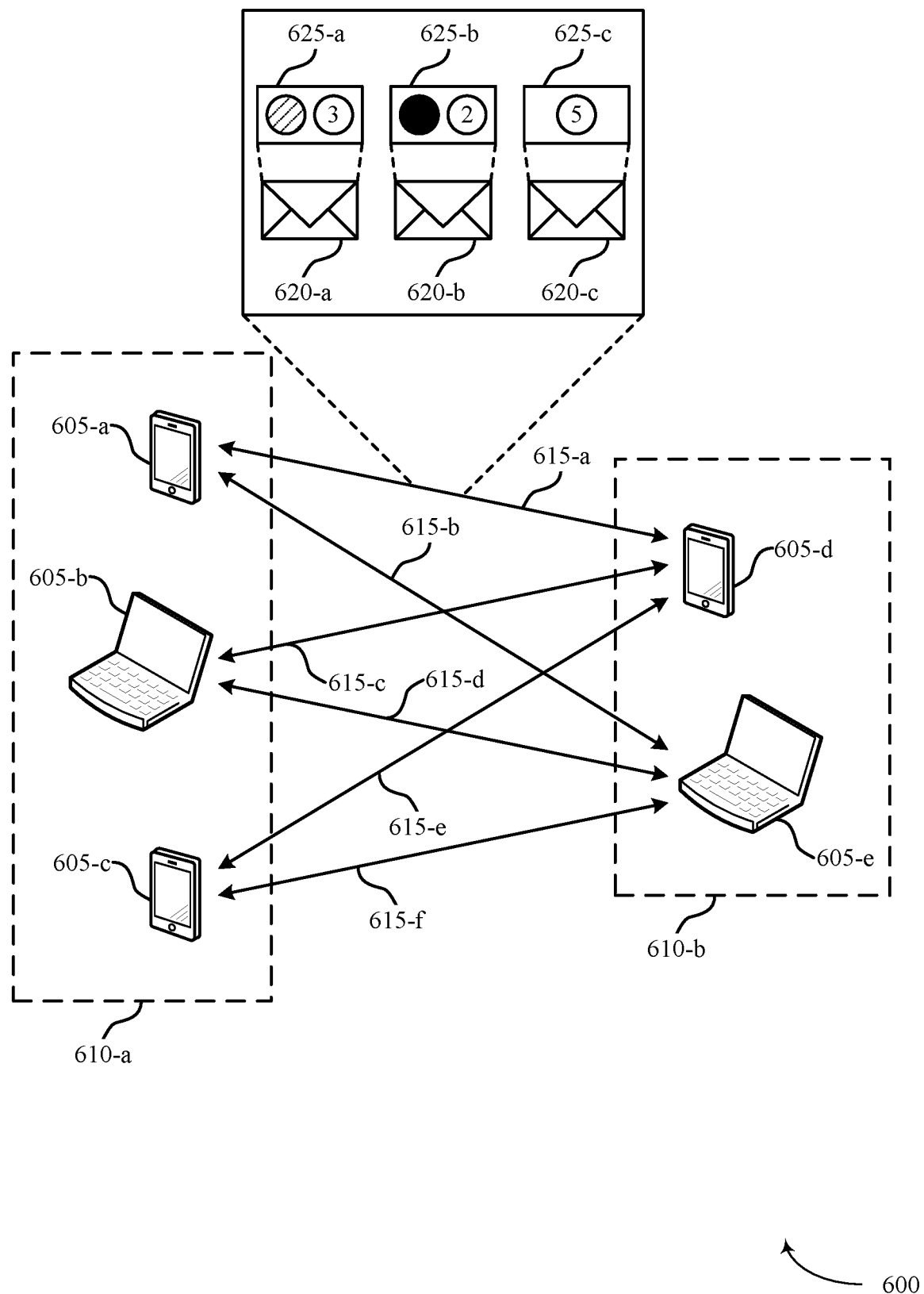
FIG. 6 illustrates an example of user relationships that support querying relationships in a communication time series in accordance with aspects of the present disclosure.

FIG. 6 illustrates an example of user relationships 600 that support querying relationships in a communication time series in accordance with various aspects of the present disclosure. User relationships 600 may include communication series 615 between user devices 605, which may be examples of cloud clients 105 or contacts 110 as described with reference to FIG. 1. In some cases, the user relationships 600 may identify relationships between groups of user devices 605. For example, the user relationships 600 may include relationships between a first group of users 610-a associated with an organization (e.g., including user devices 605-a, 605-b, and 605-c) and a second group of users 610-b outside the organization (e.g., including user devices 605-d and 605-e). The communication series 615 may include communication events 620. Each communication event 620 may include identified communication moments 625, which may be examples of moments, scores, or a combination thereof. For example, communication events 620-a, 620-b, and 620-c may include identified communication moments 625-a, 625-b, and 625-c, respectively. A user device 605 or server may process a communications language query to determine information about the user relationships 600 based on the communication series 615.

The communications language query may specify one or more users or one or more user devices 605. The query may retrieve communications data based on the user or user device 605 that sent or received the communication. In some cases, the query may retrieve communications data based on an organizational structure (e.g., the query may retrieve data for users of a certain level within the organization, and may not retrieve data for other levels of users). In other cases, the query may retrieve communications data based on a set of users or user devices 605 involved in the communication.

For example, the communications language query may query for any communication events 620 with a specified communication moment 625 between particular user devices 605, such as user device 605-a and 605-d. In this case, a user device 605 or server processing the query may search communication series 615-a for communication events 620 with the specified communication moment 625, and may not search the other communication series 615-b, 615-c, 615-d, 615-e, or 615-f. In other cases, the communications language query may specify a sender or recipient of the communication events 620 to search. For example, based on the query specifying user device 605-a as the sender, the user device 605 or server processing the query may search communication series 615-a and 615-b for any communications sent by user device 605-a with a particular communication moment 625.

In some cases, the communications language query may be based on both user relationships 600 and temporal relationships. For example, the communications language query may query for any communication events 620 with a specified communication moment 625. Based on identifying any communication events 620 with the specified communication moment 625, the user device 605 or server processing the query may identify a user associated with the identified communication events 620 (e.g., a sender or a recipient) and may search communication series 615 associated with the identified user for a second specified communication moment 625 in a communication event 620 sent or received at a later time.

Figure 7:
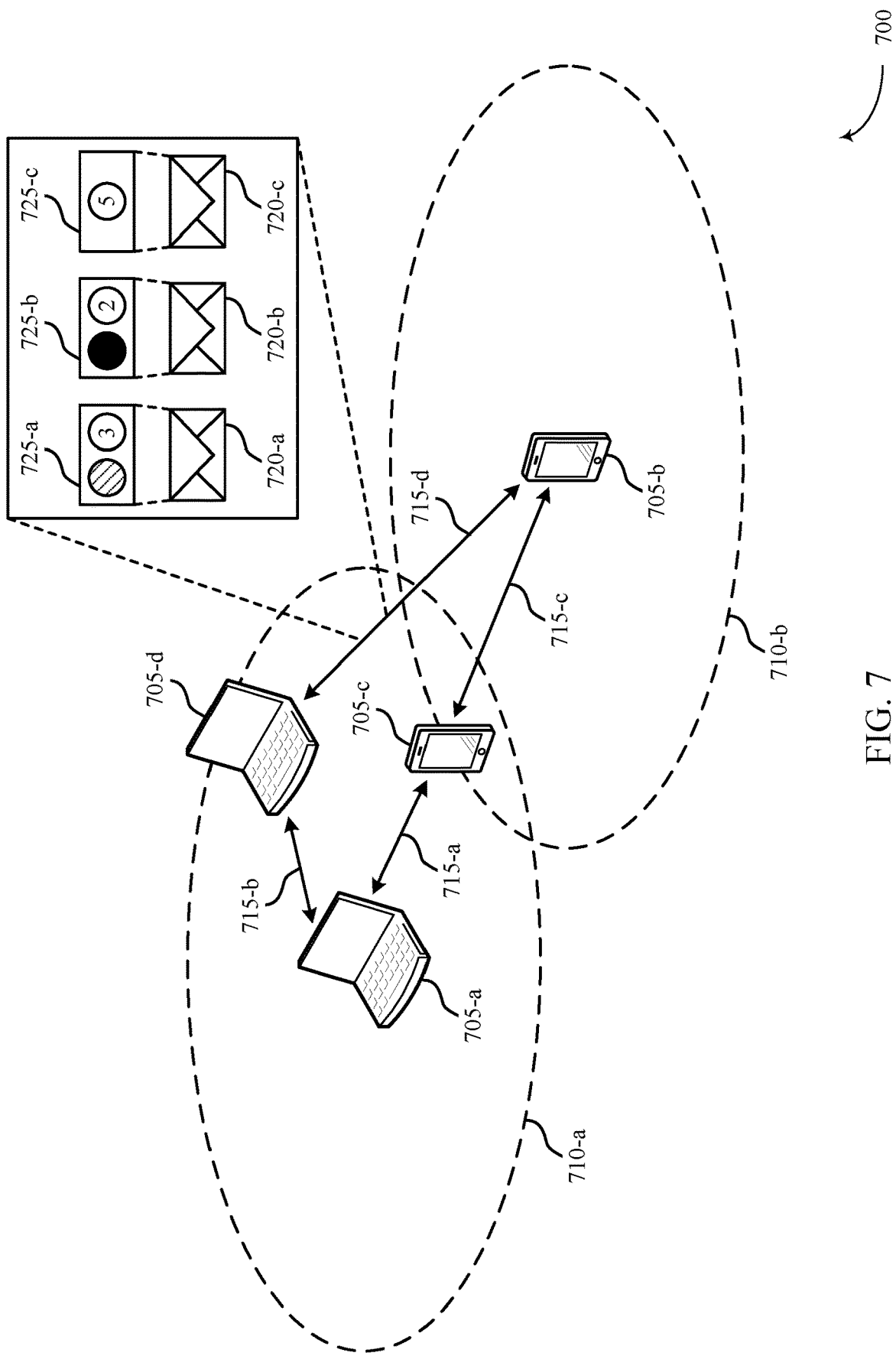
FIG. 7 illustrates an example of geographic relationships that support querying relationships in a communication time series in accordance with aspects of the present disclosure.

FIG. 7 illustrates an example of geographic relationships 700 that support querying relationships in a communication time series in accordance with various aspects of the present disclosure. Geographic relationships 700 may include communication series 715 between user devices 705, which may be examples of cloud clients 105 or contacts 110 as described with reference to FIG. 1. The communication time series 715 may include communication events 720 with associated communication moments 725, which may be examples of moments, scores, or a combination thereof. For example communication time series 715-d may include communication events 720-a, 720-b, and 720-c, which may include communication moments 725-a, 725-b, and 725-c, respectively.

In some cases, the geographic relationships 700 may identify relationships between groups of user devices 705. For example, a first group of users may include user devices 705 associated with an organization (e.g., user devices 705-a and 705-b) and a second group of users may include user devices not associated with the organization (e.g., user devices 705-c and 705-d). The first group of users may include geographic areas 710, and the geographic relationships 700 may identify relationships between user devices 705 within the geographic areas 710 and user devices 705 outside the geographic areas 710. A user device 705 or server may process a communications language query to determine information about the geographic relationships 700 based on the series of communications 715.

In some cases, the communications language query may query for communication events 720 with a specified communication moment 725 associated with a particular geographic area 710. For example, the query may specify communications sent or received in geographic area 710-b. In this case, the user device 705 or server processing the query may search communication series 715-a, 715-c, and 715-d, and may not search communication series 715-b based on communication series 715-b being both sent and received outside geographic area 710-b. In other cases, the communications language query may not specify a particular geographic area 710, and may instead specify to search communication series 715 between user devices 705 within a same geographic area 710. For example, because user devices 705-c and 705-d are within geographic area 710-a for user device 705-a, the user device 705 or server processing the query may search the communication series 715-a and 715-b. Similarly, the user device 705 or server processing the query may search the communication series 715-c for user devices 705-b and 705-c within geographic area 710-b. However, because user device 705-d is outside geographic area 710-b for user device 705-b, the user device 705 or server processing the query may not search the communication series 715-d.

Figure 8:
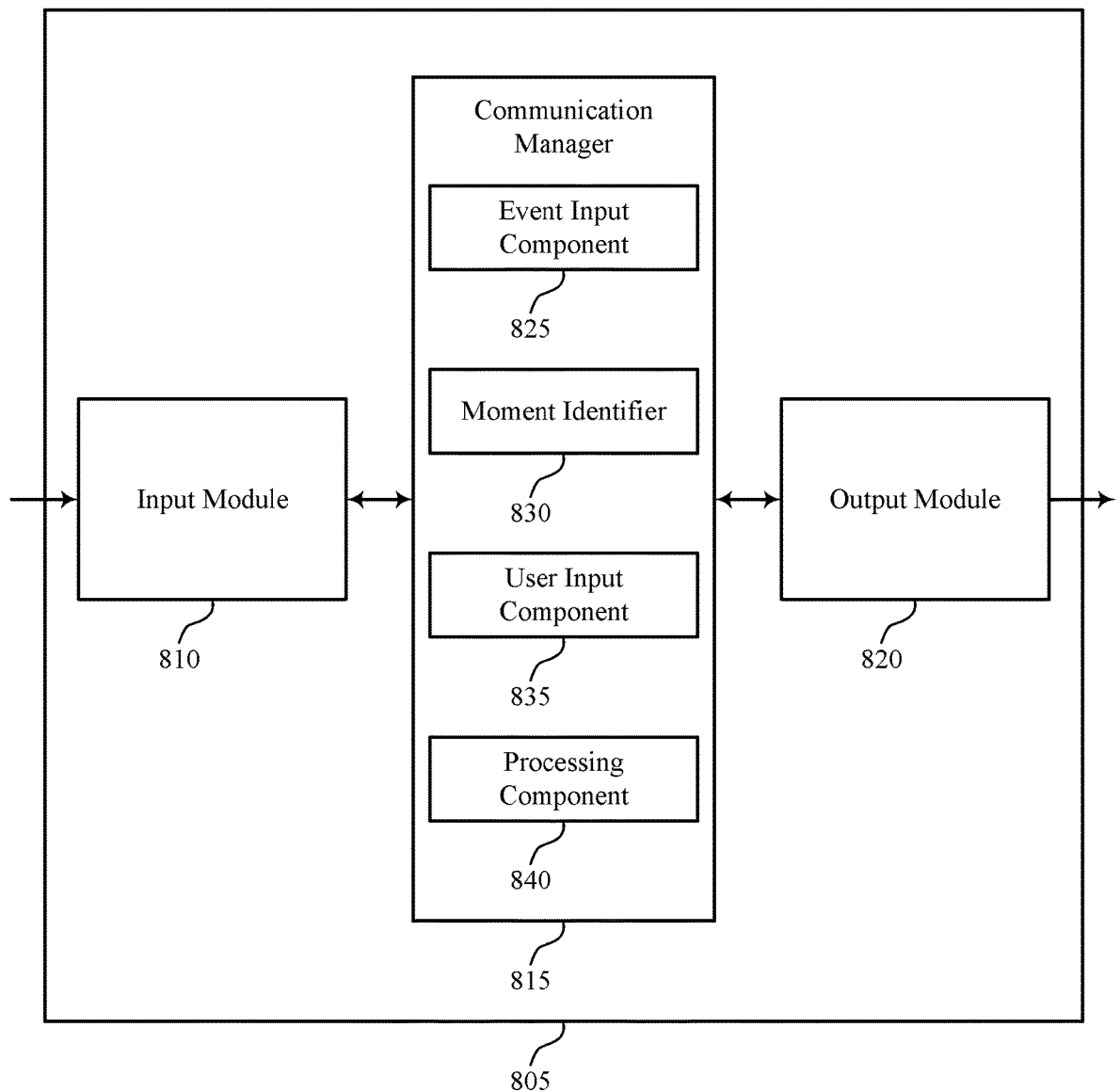
FIGS. 8 and 9 each show block diagrams of an apparatus that supports querying relationships in a communication time series in accordance with aspects of the present disclosure.

FIG. 8 shows a block diagram 800 of an apparatus 805 that supports querying relationships in a communication time series in accordance with aspects of the present disclosure. Apparatus 805 may include input module 810, communication manager 815, and output module 820. Apparatus 805 may also include a processor. Each of these components may be in communication with one another (e.g., via one or more buses). In some cases, apparatus 805 may be an example of a user terminal, a database server, or a system containing multiple computing devices. Communication manager 815 may be an example of aspects of the communication manager 1015 described with reference to FIG. 10. Communication manager 815 may also include event input component 825, moment identifier 830, user input component 835, and processing component 840.

Communication manager 815 and/or at least some of its various sub-components may be implemented in hardware, software executed by a processor, firmware, or any combination thereof. If implemented in software executed by a processor, the functions of the communication manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communication manager 815 and/or at least some of its various sub-components may be physically located at various positions, including being distributed such that portions of functions are implemented at different physical locations by one or more physical devices. In some examples, communication manager 815 and/or at least some of its various sub-components may be a separate and distinct component in accordance with various aspects of the present disclosure. In other examples, communication manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Event input component 825 may receive a set of communication events and receive a second set of communication events. In some cases, the set of communication events are received at a database server.

Moment identifier 830 may identify a set of communication moments from the set of communication events, where each communication moment includes a property of a communication event of the received set of communication events, and where the property is derived based on an analysis of the communication event. Moment identifier 830 may also identify one or more types of communication moments from the set of communication moments. In some cases, the property of the communication event of the received set of communication events includes an occurrence associated with the communication event, a score associated with the communication event, or a combination thereof.

User input component 835 may receive an input from a user, where the input includes code for identifying occurrences of a relationship between a subset of the one or more identified types of communication moments. In some cases, the relationship includes a temporal relationship between the subset of the one or more identified types of communication moments. In other cases, the subset of the one or more identified types of communication moments includes a type of communication moment indicating one or more persons associated with a communication event of the set of communication events. In yet other cases, the subset of the one or more identified types of communication moments includes a type of communication moment indicating a geographic location associated with a communication event of the set of communication events. In some cases, the input further includes a periodicity. In some cases, the input includes code for identifying occurrences of a relationship between a subset of the one or more identified types of communication moments, a subset of one or more identified types of communication events, or a combination thereof.

Processing component 840 may process the code on a computing device. In some cases, the computing device is a client device associated with the database server.

Figure 9:
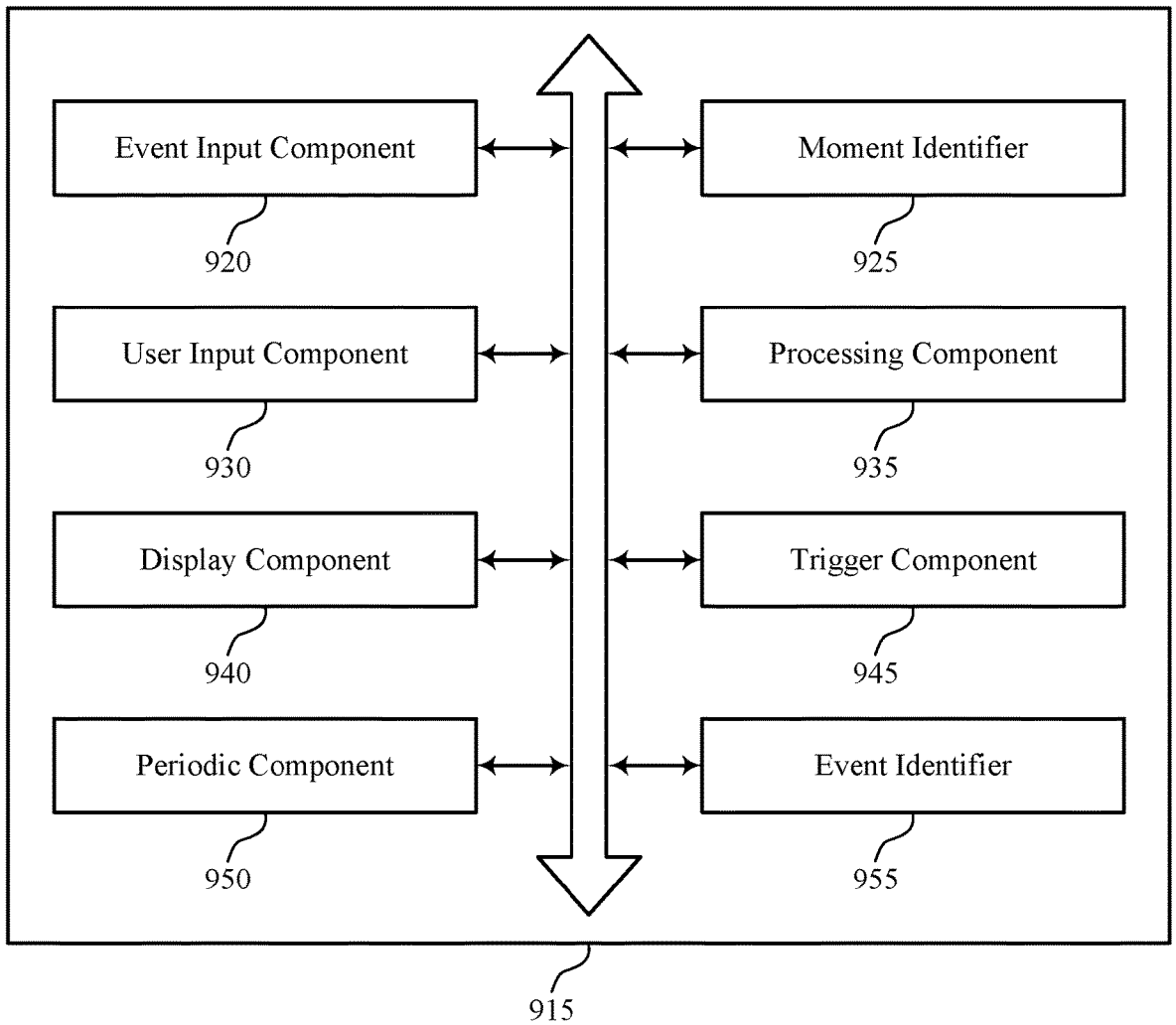

FIG. 9 shows a block diagram 900 of a communication manager 915 that supports querying relationships in a communication time series in accordance with aspects of the present disclosure. The communication manager 915 may be an example of aspects of a communication manager 815 or 1015 as described with reference to FIGS. 8 and 10. The communication manager 915 may include event input component 920, moment identifier 925, user input component 930, processing component 935, display component 940, trigger component 945, periodic component 950, and event identifier 955. Each of these modules may communicate, directly or indirectly, with one another (e.g., via one or more buses).

Event input component 920 may receive a set of communication events and receive a second set of communication events. In some cases, the set of communication events are received at a database server.

Moment identifier 925 may identify a set of communication moments from the set of communication events, where each communication moment includes a property of a communication event of the received set of communication events, and where the property is derived based on an analysis of the communication event. Moment identifier 925 may identify one or more types of communication moments from the set of communication moments. In some cases, the property of the communication event of the received set of communication events includes an occurrence associated with the communication event, a score associated with the communication event, or a combination thereof.

User input component 930 may receive an input from a user, where the input includes code for identifying occurrences of a relationship between a subset of the one or more identified types of communication moments. In some cases, the relationship includes a temporal relationship between the subset of the one or more identified types of communication moments. In other cases, the subset of the one or more identified types of communication moments includes a type of communication moment indicating one or more persons associated with a communication event of the set of communication events. In yet other cases, the subset of the one or more identified types of communication moments includes a type of communication moment indicating a geographic location associated with a communication event of the set of communication events. In some cases, the input further includes a periodicity. In some cases, the input includes code for identifying occurrences of a relationship between a subset of the one or more identified types of communication moments, a subset of one or more identified types of communication events, or a combination thereof.

Processing component 935 may process the code on a computing device. In some cases, the computing device is a client device associated with the database server.

Display component 940 may display to the user a number of the identified occurrences of the relationship, an indication of whether an occurrence of the relationship was identified, or a combination thereof.

Trigger component 945 may identify a type of communication moment from the subset of the one or more identified types of communication moments in a communication event of the second set of communication events and process the code in response to identifying the type of communication moment from the subset.

Periodic component 950 may identify that a time period has passed since processing the code, where the time period is based on the periodicity and process the code in response to identifying that the time period has passed.

Event identifier 955 may identify one or more types of communication events from the set of communication events, where the one or more types of the communication events include emails, calendar events, service tickets, short message service (SMS) text messages, voice calls, social media messages, or a combination thereof.

Figure 10:
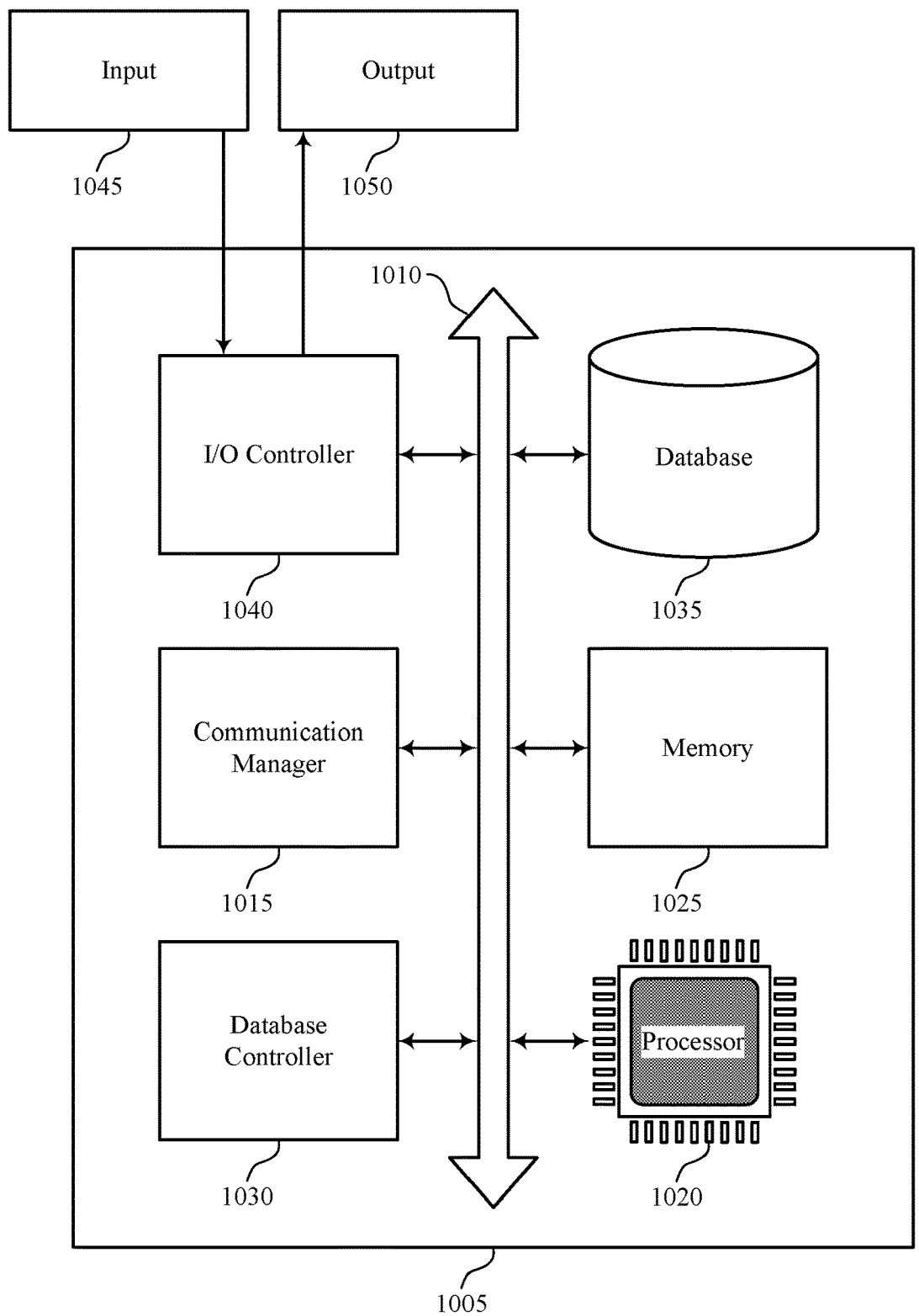
FIG. 10 illustrates a block diagram of a system including a user device or server that supports querying relationships in a communication time series in accordance with aspects of the present disclosure.

FIG. 10 shows a diagram of a system 1000 including a subsystem 1005 that supports querying relationships in a communication time series in accordance with aspects of the present disclosure. Subsystem 1005 may be an example of or include the components of a user device or a server, such as cloud client 105 or data center 120 as described above, e.g., with reference to FIG. 1. Subsystem 1005 may include components for bi-directional data communications including components for transmitting and receiving communications, including communication manager 1015, processor 1020, memory 1025, database controller 1030, database 1035, and I/O controller 1040. These components may be in electronic communication via one or more busses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting querying relationships in a communication time series).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Database controller 1030 may manage data storage and processing in database 1035. In some cases, a user may interact with database controller 1030. In other cases, database controller 1030 may operate automatically without user interaction. Database 1035 may be an example of a single database, a distributed database, multiple distributed databases, or an emergency backup database.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system. In other cases, I/O controller 1040 may represent or interact with a modem, a keyboard, a mouse, a touchscreen, or a similar device. In some cases, I/O controller 1040 may be implemented as part of a processor. In some cases, a user may interact with device 1005 via I/O controller 1040 or via hardware components controlled by I/O controller 1040.

Figure 11:
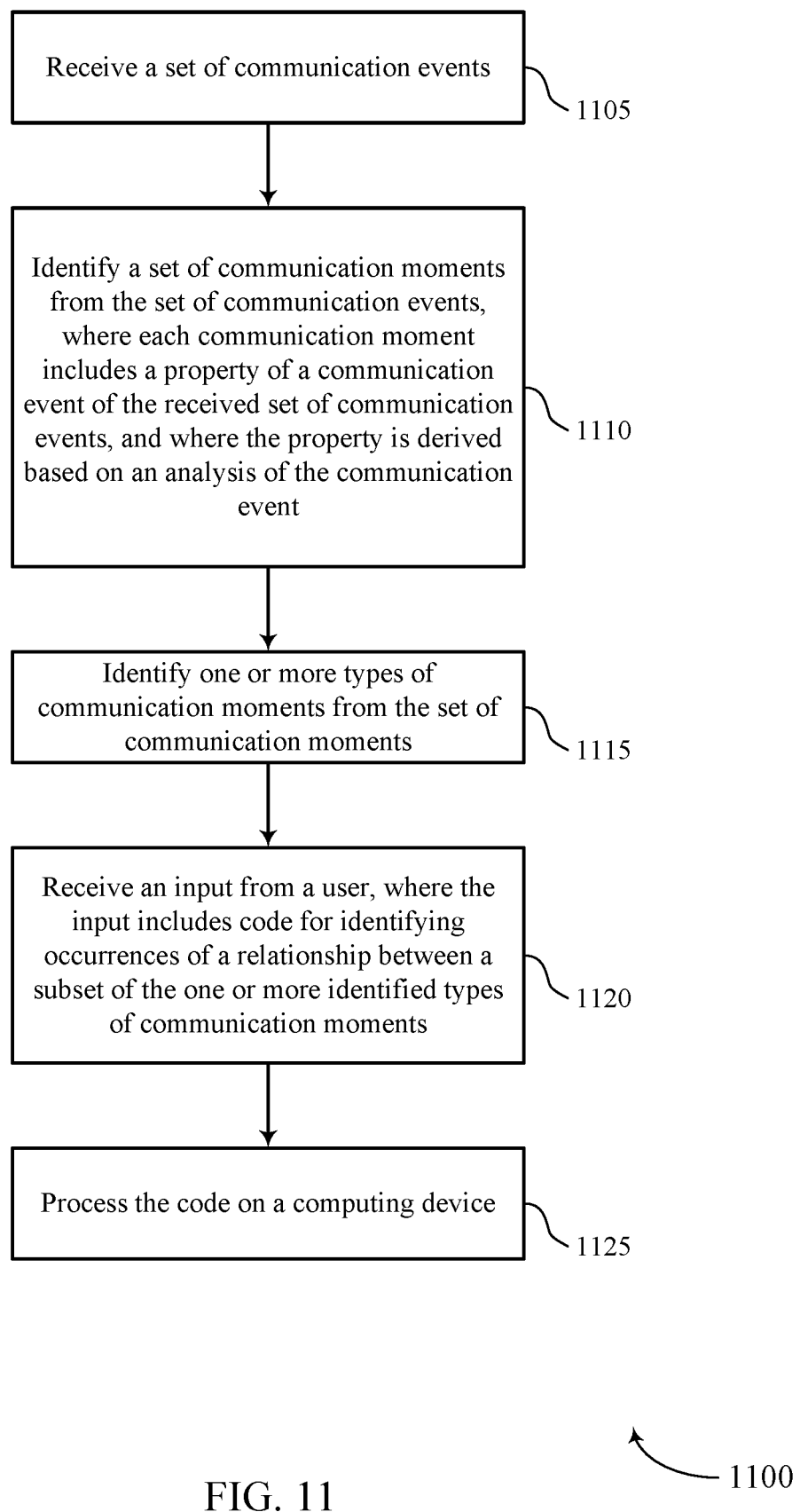
FIGS. 11 through 14 illustrate methods for querying relationships in a communication time series in accordance with aspects of the present disclosure.

FIG. 11 shows a flowchart illustrating a method 1100 for querying relationships in a communication time series in accordance with aspects of the present disclosure. The operations of method 1100 may be implemented by a user device or a server, such as a cloud client 105 or data center 120, or its components as described herein. For example, the operations of method 1100 may be performed by a communication manager as described with reference to FIGS. 8 through 10. In some examples, a user device or server may execute a set of codes to control the functional elements of the device to perform the functions described below. Additionally or alternatively, the user device or server may perform aspects of the functions described below using special-purpose hardware.

At block 1105 the user device or server may receive a plurality of communication events. The operations of block 1105 may be performed according to the methods described with reference to FIGS. 1 through 6. In certain examples, aspects of the operations of block 1105 may be performed by an event input component as described with reference to FIGS. 8 through 10.

At block 1110 the user device or server may identify a plurality of communication moments from the plurality of communication events, wherein each communication moment comprises a property of a communication event of the received plurality of communication events, and wherein the property is derived based at least in part on an analysis of the communication event. The operations of block 1110 may be performed according to the methods described with reference to FIGS. 1 through 6. In certain examples, aspects of the operations of block 1110 may be performed by a moment identifier as described with reference to FIGS. 8 through 10.

At block 1115 the user device or server may identify one or more types of communication moments from the plurality of communication moments. The operations of block 1115 may be performed according to the methods described with reference to FIGS. 1 through 6. In certain examples, aspects of the operations of block 1115 may be performed by a moment identifier as described with reference to FIGS. 8 through 10.

At block 1120 the user device or server may receive an input from a user, wherein the input comprises code for identifying occurrences of a relationship between a subset of the one or more identified types of communication moments. The operations of block 1120 may be performed according to the methods described with reference to FIGS. 1 through 6. In certain examples, aspects of the operations of block 1120 may be performed by a user input component as described with reference to FIGS. 8 through 10.

At block 1125 the user device or server may process the code on a computing device. The operations of block 1125 may be performed according to the methods described with reference to FIGS. 1 through 6. In certain examples, aspects of the operations of block 1125 may be performed by a processing component as described with reference to FIGS. 8 through 10.

Figure 12:
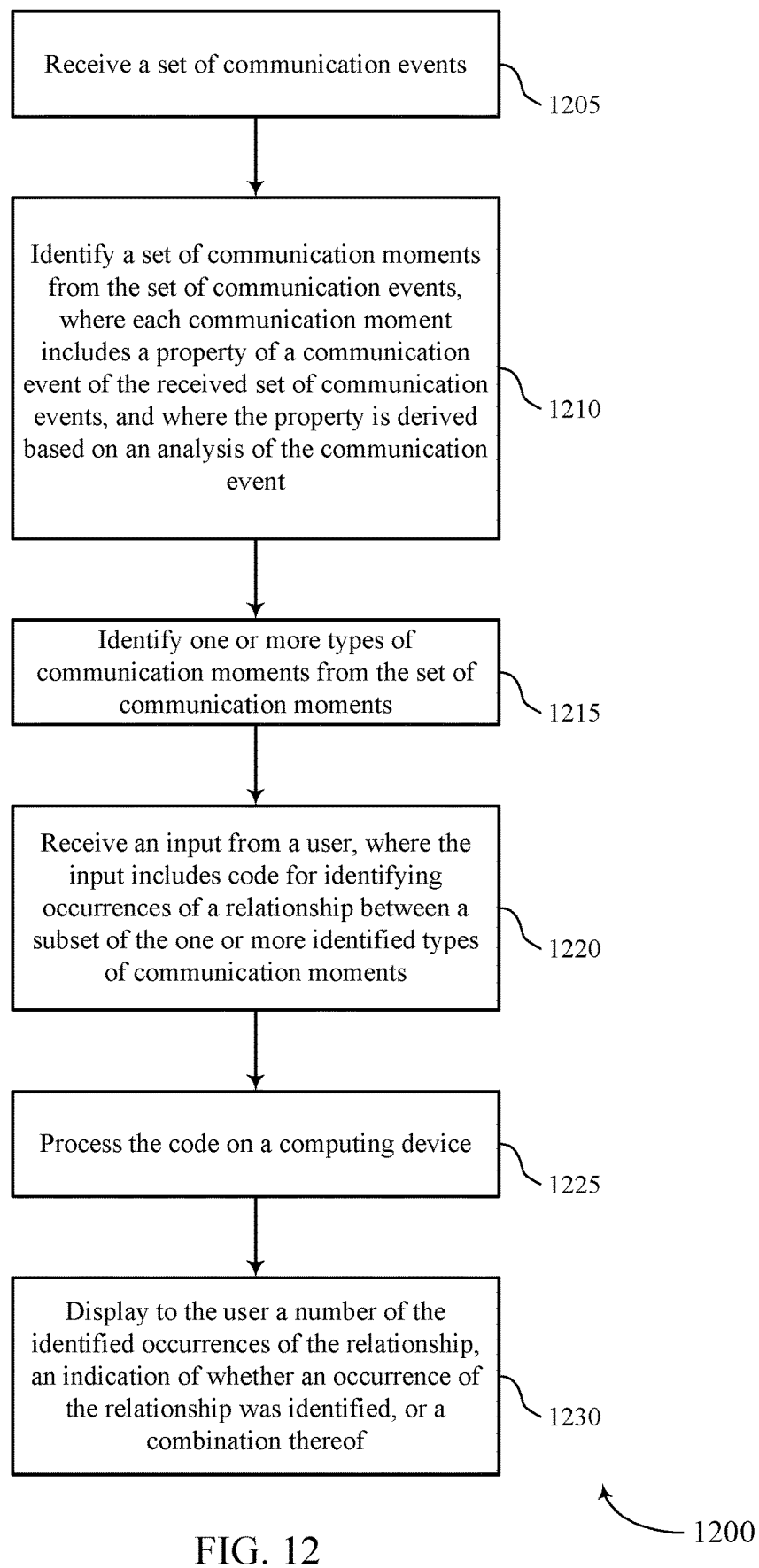

FIG. 12 shows a flowchart illustrating a method 1200 for querying relationships in a communication time series in accordance with aspects of the present disclosure. The operations of method 1200 may be implemented by a user device or a server, such as a cloud client 105 or data center 120, or its components as described herein. For example, the operations of method 1200 may be performed by a communication manager as described with reference to FIGS. 8 through 10. In some examples, a user device or server may execute a set of codes to control the functional elements of the device to perform the functions described below. Additionally or alternatively, the user device or server may perform aspects of the functions described below using special-purpose hardware.

At block 1205 the user device or server may receive a plurality of communication events. The operations of block 1205 may be performed according to the methods described with reference to FIGS. 1 through 6. In certain examples, aspects of the operations of block 1205 may be performed by an event input component as described with reference to FIGS. 8 through 10.

At block 1210 the user device or server may identify a plurality of communication moments from the plurality of communication events, wherein each communication moment comprises a property of a communication event of the received plurality of communication events, and wherein the property is derived based at least in part on an analysis of the communication event. The operations of block 1210 may be performed according to the methods described with reference to FIGS. 1 through 6. In certain examples, aspects of the operations of block 1210 may be performed by a moment identifier as described with reference to FIGS. 8 through 10.

At block 1215 the user device or server may identify one or more types of communication moments from the plurality of communication moments. The operations of block 1215 may be performed according to the methods described with reference to FIGS. 1 through 6. In certain examples, aspects of the operations of block 1215 may be performed by a moment identifier as described with reference to FIGS. 8 through 10.

At block 1220 the user device or server may receive an input from a user, wherein the input comprises code for identifying occurrences of a relationship between a subset of the one or more identified types of communication moments. The operations of block 1220 may be performed according to the methods described with reference to FIGS. 1 through 6. In certain examples, aspects of the operations of block 1220 may be performed by a user input component as described with reference to FIGS. 8 through 10.

At block 1225 the user device or server may process the code on a computing device. The operations of block 1225 may be performed according to the methods described with reference to FIGS. 1 through 6. In certain examples, aspects of the operations of block 1225 may be performed by a processing component as described with reference to FIGS. 8 through 10.

At block 1230 the user device or server may display to the user a number of the identified occurrences of the relationship, an indication of whether an occurrence of the relationship was identified, or a combination thereof. The operations of block 1230 may be performed according to the methods described with reference to FIGS. 1 through 6. In certain examples, aspects of the operations of block 1230 may be performed by a display component as described with reference to FIGS. 8 through 10.

Figure 13:
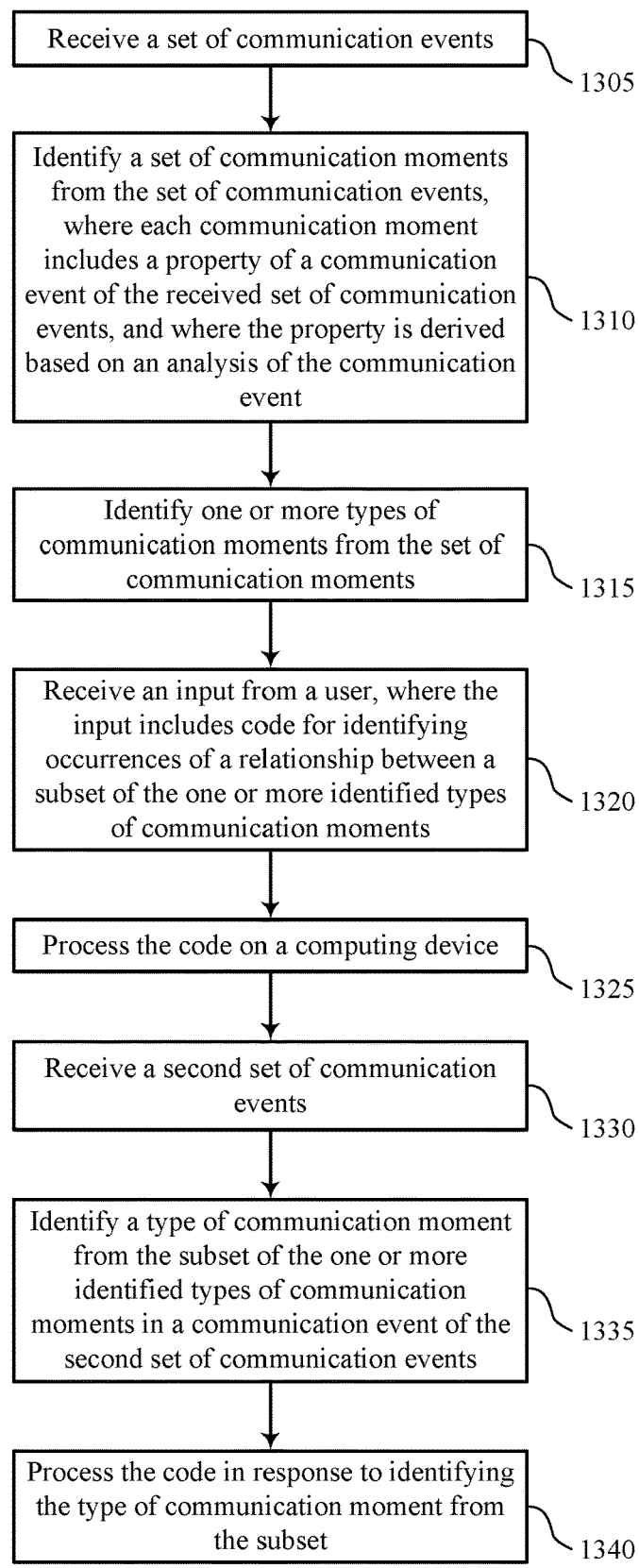

FIG. 13 shows a flowchart illustrating a method 1300 for querying relationships in a communication time series in accordance with aspects of the present disclosure. The operations of method 1300 may be implemented by a user device or a server, such as a cloud client 105 or data center 120, or its components as described herein. For example, the operations of method 1300 may be performed by a communication manager as described with reference to FIGS. 8 through 10. In some examples, a user device or server may execute a set of codes to control the functional elements of the device to perform the functions described below. Additionally or alternatively, the user device or server may perform aspects of the functions described below using special-purpose hardware.

At block 1305 the user device or server may receive a plurality of communication events. The operations of block 1305 may be performed according to the methods described with reference to FIGS. 1 through 6. In certain examples, aspects of the operations of block 1305 may be performed by an event input component as described with reference to FIGS. 8 through 10.

At block 1310 the user device or server may identify a plurality of communication moments from the plurality of communication events, wherein each communication moment comprises a property of a communication event of the received plurality of communication events, and wherein the property is derived based at least in part on an analysis of the communication event. The operations of block 1310 may be performed according to the methods described with reference to FIGS. 1 through 6. In certain examples, aspects of the operations of block 1310 may be performed by a moment identifier as described with reference to FIGS. 8 through 10.

At block 1315 the user device or server may identify one or more types of communication moments from the plurality of communication moments. The operations of block 1315 may be performed according to the methods described with reference to FIGS. 1 through 6. In certain examples, aspects of the operations of block 1315 may be performed by a moment identifier as described with reference to FIGS. 8 through 10.

At block 1320 the user device or server may receive an input from a user, wherein the input comprises code for identifying occurrences of a relationship between a subset of the one or more identified types of communication moments. The operations of block 1320 may be performed according to the methods described with reference to FIGS. 1 through 6. In certain examples, aspects of the operations of block 1320 may be performed by a user input component as described with reference to FIGS. 8 through 10.

At block 1325 the user device or server may process the code on a computing device. The operations of block 1325 may be performed according to the methods described with reference to FIGS. 1 through 6. In certain examples, aspects of the operations of block 1325 may be performed by a processing component as described with reference to FIGS. 8 through 10.

At block 1330 the user device or server may receive a second plurality of communication events. The operations of block 1330 may be performed according to the methods described with reference to FIGS. 1 through 6. In certain examples, aspects of the operations of block 1330 may be performed by an event input component as described with reference to FIGS. 8 through 10.

At block 1335 the user device or server may identify a type of communication moment from the subset of the one or more identified types of communication moments in a communication event of the second plurality of communication events. The operations of block 1335 may be performed according to the methods described with reference to FIGS. 1 through 6. In certain examples, aspects of the operations of block 1335 may be performed by a trigger component as described with reference to FIGS. 8 through 10.

At block 1340 the user device or server may process the code in response to identifying the type of communication moment from the subset. The operations of block 1340 may be performed according to the methods described with reference to FIGS. 1 through 6. In certain examples, aspects of the operations of block 1340 may be performed by a trigger component as described with reference to FIGS. 8 through 10.

Figure 14:
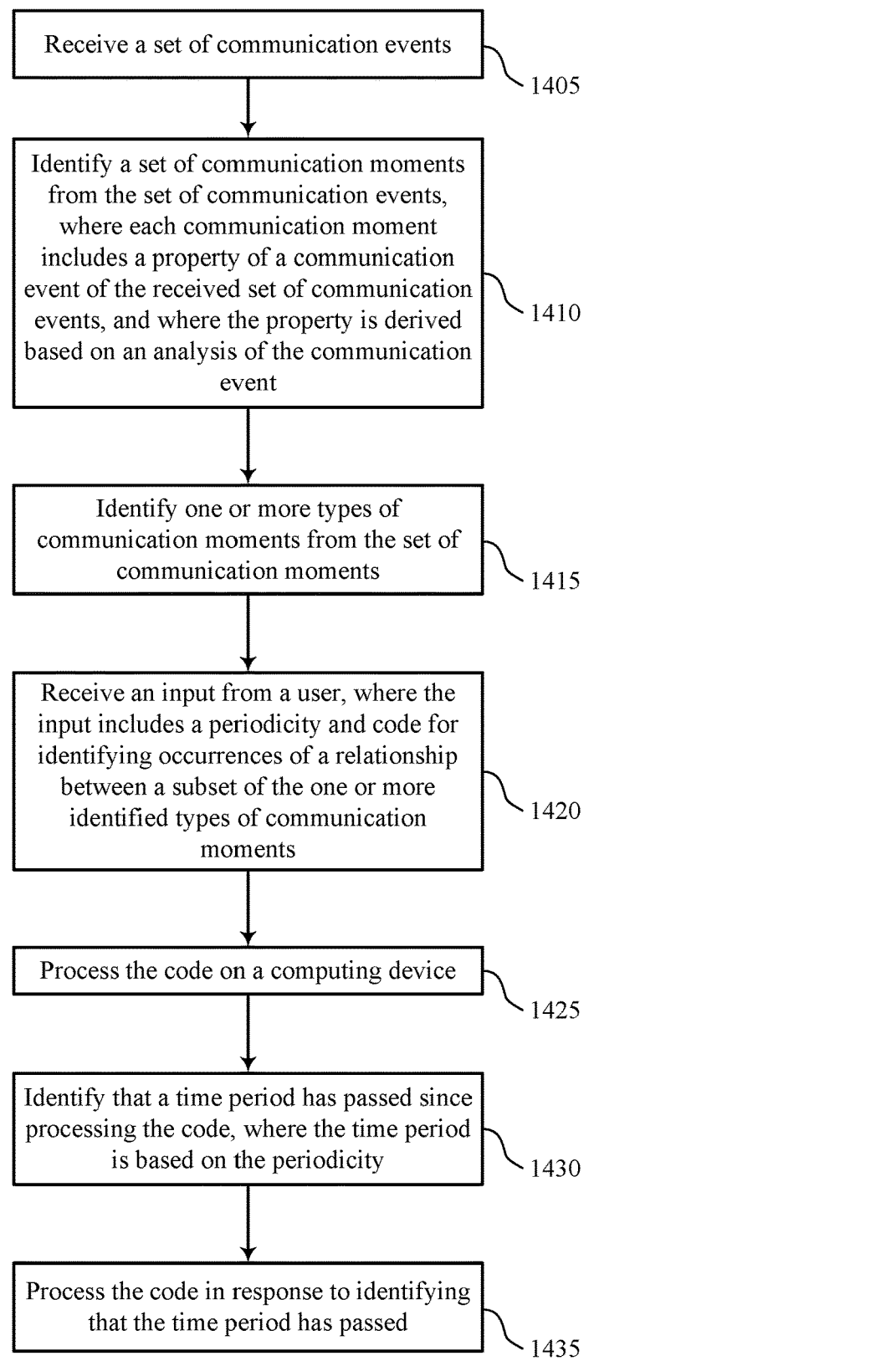

FIG. 14 shows a flowchart illustrating a method 1400 for querying relationships in a communication time series in accordance with aspects of the present disclosure. The operations of method 1400 may be implemented by a user device or server, such as a cloud client 105 or data center 120, or its components as described herein. For example, the operations of method 1400 may be performed by a communication manager as described with reference to FIGS. 8 through 10. In some examples, a user device or server may execute a set of codes to control the functional elements of the device to perform the functions described below. Additionally or alternatively, the user device or server may perform aspects of the functions described below using special-purpose hardware.

At block 1405 the user device or server may receive a plurality of communication events. The operations of block 1405 may be performed according to the methods described with reference to FIGS. 1 through 6. In certain examples, aspects of the operations of block 1405 may be performed by an event input component as described with reference to FIGS. 8 through 10.

At block 1410 the user device or server may identify a plurality of communication moments from the plurality of communication events, wherein each communication moment comprises a property of a communication event of the received plurality of communication events, and wherein the property is derived based at least in part on an analysis of the communication event. The operations of block 1410 may be performed according to the methods described with reference to FIGS. 1 through 6. In certain examples, aspects of the operations of block 1410 may be performed by a moment identifier as described with reference to FIGS. 8 through 10.

At block 1415 the user device or server may identify one or more types of communication moments from the plurality of communication moments. The operations of block 1415 may be performed according to the methods described with reference to FIGS. 1 through 6. In certain examples, aspects of the operations of block 1415 may be performed by a moment identifier as described with reference to FIGS. 8 through 10.

At block 1420 the user device or server may receive an input from a user, wherein the input comprises code for identifying occurrences of a relationship between a subset of the one or more identified types of communication moments. The input may further comprise a periodicity. The operations of block 1420 may be performed according to the methods described with reference to FIGS. 1 through 6. In certain examples, aspects of the operations of block 1420 may be performed by a user input component as described with reference to FIGS. 8 through 10.

At block 1425 the user device or server may process the code on a computing device. The operations of block 1425 may be performed according to the methods described with reference to FIGS. 1 through 6. In certain examples, aspects of the operations of block 1425 may be performed by a processing component as described with reference to FIGS. 8 through 10.

At block 1430 the user device or server may identify that a time period has passed since processing the code, wherein the time period is based at least in part on the periodicity. The operations of block 1430 may be performed according to the methods described with reference to FIGS. 1 through 6. In certain examples, aspects of the operations of block 1430 may be performed by a periodic component as described with reference to FIGS. 8 through 10.

At block 1435 the user device or server may process the code in response to identifying that the time period has passed. The operations of block 1435 may be performed according to the methods described with reference to FIGS. 1 through 6. In certain examples, aspects of the operations of block 1435 may be performed by a periodic component as described with reference to FIGS. 8 through 10.

A method of communication data processing is described. The method may include receiving a plurality of communication events, identifying a plurality of communication moments from the plurality of communication events, wherein each communication moment comprises a property of a communication event of the received plurality of communication events, and wherein the property is derived based at least in part on an analysis of the communication event, identifying one or more types of communication moments from the plurality of communication moments, receiving an input from a user, wherein the input comprises code for identifying occurrences of a relationship between a subset of the one or more identified types of communication moments, and processing the code on a computing device.

An apparatus for communication data processing is described. The apparatus may include a processor, memory in electronic communication with the processor, and instructions stored in the memory. The instructions may be operable to cause the processor to receive a plurality of communication events, identify a plurality of communication moments from the plurality of communication events, wherein each communication moment comprises a property of a communication event of the received plurality of communication events, and wherein the property is derived based at least in part on an analysis of the communication event, identify one or more types of communication moments from the plurality of communication moments, receive an input from a user, wherein the input comprises code for identifying occurrences of a relationship between a subset of the one or more identified types of communication moments, and process the code on a computing device.

A non-transitory computer readable medium for communication data processing is described. The non-transitory computer-readable medium may include instructions operable to cause a processor to receive a plurality of communication events, identify a plurality of communication moments from the plurality of communication events, wherein each communication moment comprises a property of a communication event of the received plurality of communication events, and wherein the property is derived based at least in part on an analysis of the communication event, identify one or more types of communication moments from the plurality of communication moments, receive an input from a user, wherein the input comprises code for identifying occurrences of a relationship between a subset of the one or more identified types of communication moments, and process the code on a computing device.

In some examples of the method, apparatus, and non-transitory computer-readable medium described above, the relationship comprises a temporal relationship between the subset of the one or more identified types of communication moments.

In some examples of the method, apparatus, and non-transitory computer-readable medium described above, the subset of the one or more identified types of communication moments comprises a type of communication moment indicating one or more persons associated with a communication event of the plurality of communication events.

In some examples of the method, apparatus, and non-transitory computer-readable medium described above, the subset of the one or more identified types of communication moments comprises a type of communication moment indicating a geographic location associated with a communication event of the plurality of communication events.

Some examples of the method, apparatus, and non-transitory computer-readable medium described above may further include processes, features, means, or instructions for displaying to the user a number of the identified occurrences of the relationship, an indication of whether an occurrence of the relationship was identified, or a combination thereof.

Some examples of the method, apparatus, and non-transitory computer-readable medium described above may further include processes, features, means, or instructions for receiving a second plurality of communication events. Some examples of the method, apparatus, and non-transitory computer-readable medium described above may further include processes, features, means, or instructions for identifying a type of communication moment from the subset of the one or more identified types of communication moments in a communication event of the second plurality of communication events. Some examples of the method, apparatus, and non-transitory computer-readable medium described above may further include processes, features, means, or instructions for processing the code in response to identifying the type of communication moment from the subset.

In some examples of the method, apparatus, and non-transitory computer-readable medium described above, the input further comprises a periodicity. Some examples of the method, apparatus, and non-transitory computer-readable medium described above may further include processes, features, means, or instructions for identifying that a time period may have passed since processing the code, wherein the time period may be based at least in part on the periodicity. Some examples of the method, apparatus, and non-transitory computer-readable medium described above may further include processes, features, means, or instructions for processing the code in response to identifying that the time period may have passed.

In some examples of the method, apparatus, and non-transitory computer-readable medium described above, the plurality of communication events may be received at a database server.

In some examples of the method, apparatus, and non-transitory computer-readable medium described above, the computing device may be a client device associated with the database server.

Some examples of the method, apparatus, and non-transitory computer-readable medium described above may further include processes, features, means, or instructions for identifying one or more types of communication events from the plurality of communication events, wherein the one or more types of the communication events comprise emails, calendar events, service tickets, short message service (SMS) text messages, voice calls, social media messages, or a combination thereof.

In some examples of the method, apparatus, and non-transitory computer-readable medium described above, the input comprises code for identifying occurrences of a relationship between a subset of the one or more identified types of communication moments, a subset of the one or more identified types of communication events, or a combination thereof.

In some examples of the method, apparatus, and non-transitory computer-readable medium described above, the property of the communication event of the received plurality of communication events comprises an occurrence associated with the communication event, a score associated with the communication event, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication data processing, comprising:
   receiving a plurality of communication events;
   performing a natural language processing (NLP) analysis on the plurality of communication events;
   creating a plurality of communication moments for the plurality of communication events based at least in part on the NLP analysis, wherein each communication moment of the plurality of communication moments is derived based at least in part on a property of a communication event of the received plurality of communication events and an association between the property and a type of communication moment determined by the NLP analysis;
   identifying one or more types of communication moments from the plurality of communication moments;
   receiving an input from a user, wherein the input comprises code implementing a communications language query for identifying occurrences of a relationship for a subset of the one or more identified types of communication moments; and
   processing the code on a computing device.

2. The method of claim 1, wherein the relationship comprises a temporal relationship for the subset of the one or more identified types of communication moments.

3. The method of claim 1, wherein the subset of the one or more identified types of communication moments comprises a type of communication moment indicating one or more persons associated with a communication event of the plurality of communication events.

4. The method of claim 1, wherein the subset of the one or more identified types of communication moments comprises a type of communication moment indicating a geographic location associated with a communication event of the plurality of communication events.

5. The method of claim 1, further comprising:
   displaying to the user a number of the identified occurrences of the relationship, an indication of whether an occurrence of the relationship was identified, or a combination thereof.

6. The method of claim 1, further comprising:
   receiving a second plurality of communication events;
   identifying a type of communication moment from the subset of the one or more identified types of communication moments in a communication event of the second plurality of communication events; and
   processing the code in response to identifying the type of communication moment from the subset.

7. The method of claim 1, wherein the input further comprises a periodicity, the method further comprising:
   identifying that a time period has passed since processing the code, wherein the time period is based at least in part on the periodicity; and
   processing the code in response to identifying that the time period has passed.

8. The method of claim 1, wherein the plurality of communication events are received at a database server.

9. The method of claim 8, wherein the computing device is a client device associated with the database server.

10. The method of claim 1, further comprising:
    identifying one or more types of communication events from the plurality of communication events, wherein the one or more types of the communication events comprise emails, calendar events, service tickets, short message service (SMS) text messages, voice calls, social media messages, or a combination thereof.

11. The method of claim 10, wherein the input comprises code for identifying occurrences of a relationship for a subset of the one or more identified types of communication moments, a subset of the one or more identified types of communication events, or a combination thereof.

12. The method of claim 1, wherein the property of the communication event of the received plurality of communication events comprises an occurrence associated with the communication event, a score associated with the communication event, or a combination thereof.

13. An apparatus for communication data processing, comprising:
    a processor;
    memory in electronic communication with the processor; and
    instructions stored in the memory and operable, when executed by the processor, to cause the apparatus to:
       receive a plurality of communication events;
       perform a natural language processing (NLP) analysis on the plurality of communication events;
       create a plurality of communication moments for the plurality of communication events based at least in part on the NLP analysis, wherein each communication moment of the plurality of communication moments is derived based at least in part on a property of a communication event of the received plurality of communication events and an association between the property and a type of communication moment determined by the NLP analysis;
identify one or more types of communication moments from the plurality of communication moments;
receive an input from a user, wherein the input comprises code implementing a communications language query for identifying occurrences of a relationship for a subset of the one or more identified types of communication moments; and
process the code on a computing device.

14. The apparatus of claim 13, wherein the instructions are further executable by the processor to:
display to the user a number of the identified occurrences of the relationship, an indication of whether an occurrence of the relationship was identified, or a combination thereof.

15. The apparatus of claim 13, wherein the instructions are further executable by the processor to:
receive a second plurality of communication events;
identify a type of communication moment from the subset of the one or more identified types of communication moments in a communication event of the second plurality of communication events; and
process the code in response to identifying the type of communication moment from the subset.

16. The apparatus of claim 13, wherein the input further comprises a periodicity, and the instructions are further executable by the processor to:
identify that a time period has passed since processing the code, wherein the time period is based at least in part on the periodicity; and
process the code in response to identifying that the time period has passed.

17. A non-transitory computer readable medium storing code for communication data processing, the code comprising instructions executable by a processor to:
receive a plurality of communication events;
perform a natural language processing (NLP) analysis on the plurality of communication events;
create a plurality of communication moments for the plurality of communication events based at least in part on the NLP analysis, wherein each communication moment of the plurality of communication moments is derived based at least in part on a property of a communication event of the received plurality of communication events and an association between the property and a type of communication moment determined by the NLP analysis;
identify one or more types of communication moments from the plurality of communication moments;
receive an input from a user, wherein the input comprises code implementing a communications language query for identifying occurrences of a relationship for a subset of the one or more identified types of communication moments; and
process the code on a computing device.

18. The non-transitory computer-readable medium of claim 17, wherein the instructions are further executable by the processor to:
display to the user a number of the identified occurrences of the relationship, an indication of whether an occurrence of the relationship was identified, or a combination thereof.

19. The non-transitory computer-readable medium of claim 17, wherein the instructions are further executable by the processor to:
receive a second plurality of communication events;
identify a type of communication moment from the subset of the one or more identified types of communication moments in a communication event of the second plurality of communication events; and
process the code in response to identifying the type of communication moment from the subset.

20. The non-transitory computer-readable medium of claim 17, wherein the input further comprises a periodicity, and the instructions are further executable by the processor to:
identify that a time period has passed since processing the code, wherein the time period is based at least in part on the periodicity; and
process the code in response to identifying that the time period has passed.

* * * * *